United States Patent [19]

Aizawa et al.

[11] Patent Number: 5,801,847
[45] Date of Patent: Sep. 1, 1998

[54] IMAGING AND RECORDING APPARATUS

[75] Inventors: Iwao Aizawa, Yokohama; Shigeyuki Itoh, Kawasaki; Manabu Wakabayashi, Yokohama, all of Japan

[73] Assignee: Hitachi, Ltd., Tokyo, Japan

[21] Appl. No.: 790,061

[22] Filed: Jan. 28, 1997

Related U.S. Application Data

[63] Continuation of Ser. No. 462,486, Jun. 5, 1995, Pat. No. 5,699,173, which is a continuation of Ser. No. 215,625, Mar. 22, 1994, Pat. No. 5,539,535.

[30] Foreign Application Priority Data

Mar. 25, 1993 [JP] Japan ................... 5-066878

[51] Int. Cl.$^6$ .................. H04N 1/00; H04N 1/40; H04N 5/225; H04N 1/32
[52] U.S. Cl. .................. 358/468; 358/404; 358/444; 358/906; 358/909.1; 348/207; 364/238.4; 364/242.3
[58] Field of Search .................. 358/468, 444, 358/443, 409, 410, 434, 435, 438, 439, 909.1, 404, 906; 348/552, 207; 364/242.3, 242.31, 242.32, 242.34, 238.4

[56] References Cited

U.S. PATENT DOCUMENTS

| | | | |
|---|---|---|---|
| 4,191,459 | 3/1980 | Saito et al. | 396/250 |
| 4,937,676 | 6/1990 | Finelli et al. | 358/906 |
| 5,091,787 | 2/1992 | Watanabe et al. | 358/906 |
| 5,278,604 | 1/1994 | Nakamura | 354/412 |
| 5,283,662 | 2/1994 | Nakajima | 358/409 |
| 5,402,170 | 3/1995 | Parulski et al. | 348/552 |
| 5,438,359 | 8/1995 | Aoki | 348/552 |
| 5,475,441 | 12/1995 | Parulski et al. | 348/552 |
| 5,506,617 | 4/1996 | Parulski et al. | 348/552 |
| 5,534,921 | 7/1996 | Sawanobori | 348/333 |

OTHER PUBLICATIONS

"Logitech Fotoman Plus Camera for Computers, User's Guide", by Logitech, Copyright 1992, Released: Aug. 1994, pp. i–vii and 1–68.

"FotoMan Makes it a Snap to Work with Photos on Your PC", D. DeJean, p. 30, *PC Computing*, Dec. 1991.

*Primary Examiner*—Kim Yen Vu
*Assistant Examiner*—Kimberly A. Williams
*Attorney, Agent, or Firm*—Antonelli, Terry, Stout & Kraus, LLP

[57] ABSTRACT

An imaging and recording apparatus for electrically recording an optical image of a subject as an image information signal which facilitates memory access from an external device and prevents image information from being changed. Upon manipulation of a recording trigger switch, an image outputted from a camera signal processing circuit at that time is written into a semiconductor memory, then subjected to data compression in a data compression circuit, and stored in a semiconductor memory. It is now assumed that an external device not illustrated is connected to a connector and this external device orders taking in the image of the semiconductor memory. If at this time the semiconductor memory is writing an image, a state detection circuit detects the fact and inhibits the external device from taking in the image. Furthermore, while the external device is taking in the image of the semiconductor memory, the state detection circuit detects this fact. Even if the recording trigger switch is manipulated, an AND gate turns off in response to an output of the state detection circuit and inhibits image writing into the semiconductor memory.

24 Claims, 9 Drawing Sheets

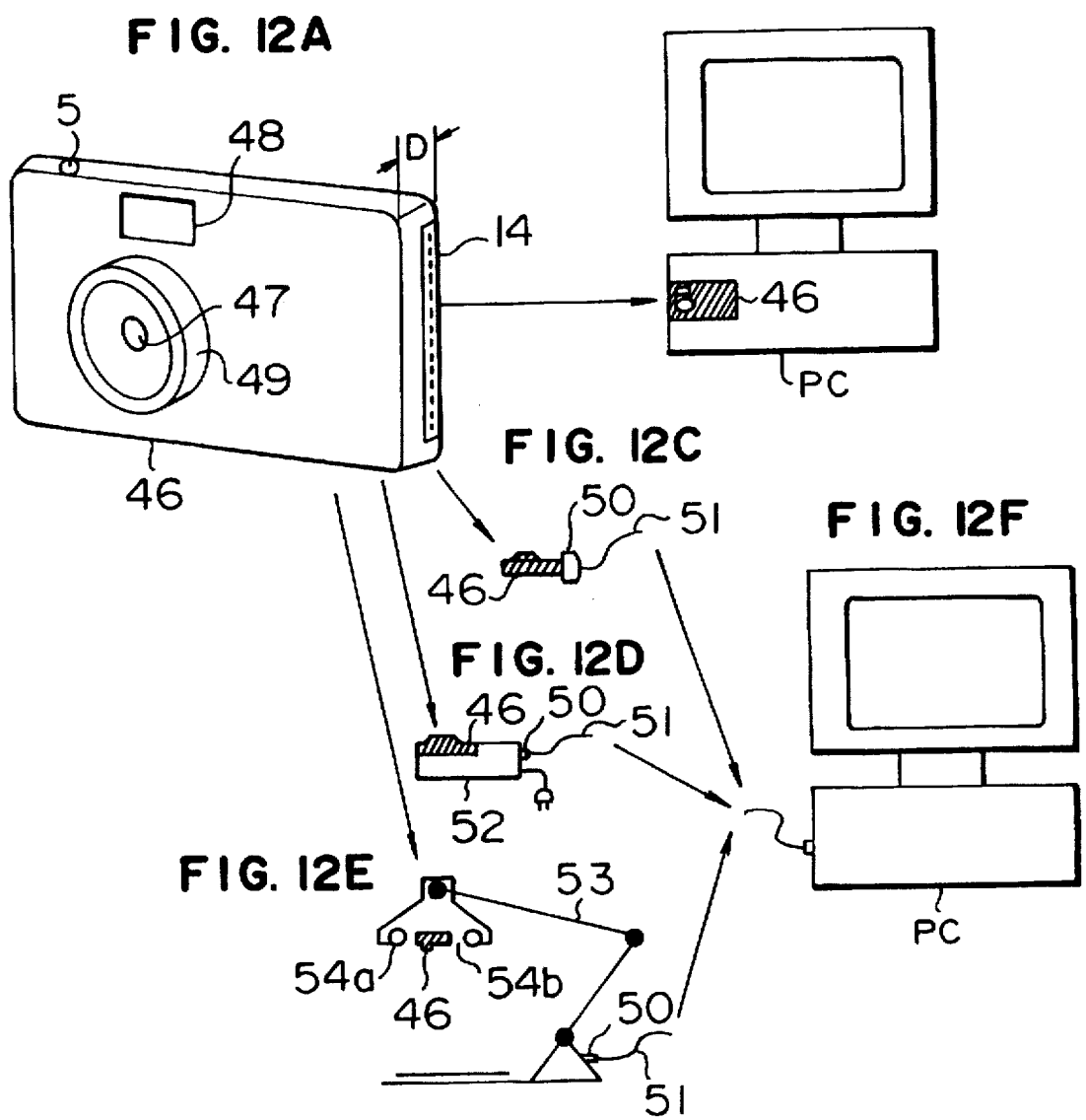

IMAGING AND RECORDING APPARATUS

This application is a continuation of U.S. application Ser. No. 08/462,486, filed Jun. 5, 1995, now U.S. Pat. No. 5,699,173 which is a continuation of application Ser. No. 08/215,625, filed Mar. 22, 1994, now U.S. Pat. No. 5,539,535.

BACKGROUND OF THE INVENTION

The present invention relates to an imaging and recording apparatus for electrically recording optical images of a subject as image information signals, and in particular to an imaging and recording apparatus having enhanced manipulation performance when the apparatus is connected to a peripheral device and the image information signals are exchanged between the apparatus and the device.

As conventional apparatuses of this kind, there are so-called electronic cameras. Examples of the electronic cameras include a digital still camera described in Sasaki et al., "Picture coding for digital still camera", Journal of The Institute of Television Engineers of Japan, Vol. 46, No. 3, (1992), pp. 300-307 (hereafter referred to as conventional technique reference 1) and a camera of DS-100 type described in a catalog "FUJIX DIGITAL STILL CAMERA SYSTEM" published by Fuji Photo Film Co. Ltd. in September 1991 (hereafter referred to as conventional technique reference 2).

In electronic cameras described in the conventional technique references 1 and 2, image information signals derived by using an imaging device are digitized (quantized) and recorded in a card having a semiconductor memory thereon (hereafter referred to as memory card) as shown, for example, in FIG. 1 of the conventional technique reference 1.

In the conventional technique references 1 and 2, image information signals are thus handled as digital signals. Therefore, connection to peripheral devices such as personal computers originally handling only digital signals is easy (because signals can be transmitted and received as digital signals without the intervention of analog-digital converters and the like). Furthermore, the image quality degradation is not caused by the transmission line. Thus, the performance of connection with other systems is shown to be good.

In the conventional technique reference 1, concrete examples regarding the connection with peripheral devices are not described. However, it is considered that a memory card is used as an intermediate medium. In the conventional technique reference 2, an example of use of such a memory card is disclosed. That is to say, a memory card is first mounted on an electronic camera to record image information signals. Thereafter, this memory card is detached from the electronic camera and mounted on a peripheral device separate from the electronic camera. The image information signals recorded on the memory card are read out into this peripheral device. In this case as well, no methods are disclosed except the above described method using a memory card as the intermediate medium as the method for transmitting image information recorded in the memory by the electronic camera to the peripheral device in the form of digital signals as they are (with the intervention of neither a digital-analog converter nor an analog-digital converter).

As a known apparatus connected to a personal computer or the like to electrically transmit and receive image information signals, there is a still image compressing and expanding substrate of FSA 2001 type described in "Summary of FSA 2001" published by Fuji Film Microdevices Corporation on Jun. 24, 1991 (hereafter referred to as conventional technique reference 3). The apparatus described in this conventional technique reference 3 incorporates a semiconductor memory for storing digital image information signals. Between this apparatus and a personal computer connected thereto via a connector, a cable and the like, the digital image information signals are stored in the above described semiconductor memory or digital image information signals already stored are transmitted and received in the form of digital signals as they are.

Apparatuses of the conventional technique references 1 and 2 are camera apparatuses having imaging means for generating electrical image information signals from optical images. On the other hand, the apparatus of the conventional technique reference 3 has no such means and image information signals are generated by a personal computer. Image information signals generated by the personal computer are transmitted to the apparatus described in the conventional technique reference and stored temporarily in a first memory. Subsequently, the image information signals read out from the first memory are subjected to image data compression processing using the DCT (discrete cosine transform) method and resultant signals are sent back to the above described personal computer. Such an operation is similar to the operation of the apparatus block shown in FIG. 2 of the conventional technique reference 1.

Operation for writing or reading image information signals in the apparatus described in the conventional technique reference 3 is executed under time management of the connected personal computer. Otherwise, duplication of writing operation and reading operation of information data in the above described first memory may cause data of a certain image to be switched to data of a different image while the former cited data are being read out, resulting in deformed image information. Such a disadvantage can be prevented in the apparatus described in the conventional technique reference 3.

The apparatus described in the conventional technique reference 3 conducts processing for compressing the above described image data and outputs image information signals thus compressed. Data are outputted from this apparatus to the personal computer in synchronism with a clock outputted from the personal computer. However, image data compression is conducted by using an independent clock within this apparatus, i.e., a clock which is not in synchronism with the clock outputted from the personal computer. Therefore, the apparatus has a buffer memory of so-called FIFO (Fast In/Fast out) type.

Operation of this FIFO memory will now be described by referring to FIG. 2.

In FIG. 2, the FIFO memory 21 has data storage areas of memory address 0, 1, 2, ..., n, n+1, ..., m. Upon operation start of the memory 21, data are written into address 0, and then in the order of address 1, 2, .... The write address is updated every repetition timing of the above described clock within the apparatus. If data are written into the address n, data readout is started from the address 0 at this timing. In the same way as writing, data are then read in the order of address 1, 2, .... The read address is updated every repetition timing of an external clock supplied from the above described personal computer to the above described apparatus. Thereafter, the read address is also updated so as to follow the write address successively updated. As for both writing and reading, upon reaching address m, the address is so controlled as to return to address 0 at the next clock timing.

The FIFO memory is operated as heretofore described. It is now assumed that Aos (=n) is the address offset value of the initial state between writing and reading, whereas A'os (=m−n) is the address offset value between writing and reading when the write address has reached the final address m of the buffer memory, and T is the repetition period of the above described read clock supplied from the outside. Even if the timing of the write clock is deviated from the generation timing of the read clock by at most Aos×T in the lag direction and by at most A'os×T in the lead direction, data can be read out correctly in the order in which they have been written into the memory. That is to say, between systems activated by asynchronous clocks, data transfer can be executed in the correct order by providing a FIFO buffer memory between them.

In case a FIFO memory is used, however, the write clock (internal clock of the above described apparatus in case of compressed data output operation mode of the apparatus described in the conventional technique reference 3) and the read clock (the clock supplied from the personal computer to the above described apparatus in case of the compressed data output operation mode) cannot be established without mutual relation at all. As for the difference in repetition frequency between clocks, for example, the address offset value regulated from the capacity of the buffer memory in use becomes a restriction factor. Furthermore, the start timing of read operation must be subjected to time management with respect to timing of write operation.

The apparatus described in the conventional technique reference 3 further has a function of inputting a compressed image information signal from the personal computer, restoring the original uncompressed image information signal in an internal data expansion circuit, storing the restored original uncompressed image information signal in the above described first semiconductor memory, and thereafter returning this restored image information signal to the personal computer. In such operation as well, operation timing of this apparatus is executed under management of the connected personal computer. Therefore, it is possible to prevent such a situation that writing, into the first semiconductor memory, an image information signal which has not been subjected to compression processing and which is supplied from the computer overlaps in time with writing the above described restored image information signal into the first semiconductor memory.

In such operation, the FIFO memory operates by using, as a write clock, the clock supplied from the personal computer and using, as a read clock, the internal clock of the apparatus. The interrelation between these two clocks is the same as that of the output operation of the above described compressed image information signal.

In the apparatus described in the conventional technique reference 3, the program of the personal computer connected for use is configured so as to prevent occurrence, in the FIFO memory, of such an operation mode that writing using the internal clock of the apparatus overlaps in time with writing using the clock supplied from the personal computer.

Electronic circuits for the imaging and recording apparatuses such as electronic cameras described in the conventional technique references 1 and 2 can be implemented in extremely small-sized circuit blocks by using recent high-integration LSI technique and high-density substrate mounting technique. Therefore, especially in fabricating a small-sized camera using a monofocus optical lens and a memory card as described in the above described conventional technique reference, the space for housing this memory card, the space for mounting a memory card loading connector, or the space of a mechanism for pulling out the memory card becomes a primary factor hindering the size reduction.

Furthermore, it is conceivable to reduce the size of the memory card as the size of the apparatus is reduced. However, pulling out a further smaller-sized memory card from a smaller-sized apparatus involves troublesome manipulation. There is also a fear that the apparatus will be inadvertently dropped in pulling out the memory card and the apparatus will be destroyed.

The above described disadvantage caused by pulling out and putting in the memory card can be dissolved by providing a connector for inputting and outputting image information signals in the imaging and recording apparatus and thereby sending/receiving signals directly to/from an external device via this connector. In the imaging and recording apparatus, however, there is provided a recording switch corresponding to the shutter button of a conventional film camera. There is a case where closing this recording switch causes execution of operation of taking in an optical image at an arbitrary timing which is desired by the operator and which is not restricted by the operation situation of an external device connected to the above described connector and recording the optical image in the semiconductor memory as an electric signal. Or there is a case where the execution is desired. For example, the case where an external device is put into the connector in such a state that the recording operation within the apparatus is not yet been completed after the recording switch has been closed corresponds to the former case. The case where a picture is to be recorded without throwing away the chance of clicking the shutter at certain moment corresponds to the latter case. In case a connector as described above is provided in the imaging and recording apparatus, there is needed new operation management differing from the aforementioned apparatus described in the conventional technique reference 3, in which every apparatus operation is subjected to centralized management by a computer, in order to prevent deformation of image contents caused by overlap of information writing with information reading in the semiconductor memory or in order to avoid disadvantage of deformation of image contents resulting from competition in the same semiconductor memory between information writing caused by manipulation of the recording switch and information writing inputted from an external device.

Furthermore, a personal computer is conceivable as an external device for exchanging image information with the imaging and recording apparatus. In this case, however, it is extremely effective from the aspects of universality and manipulation capability to make possible information exchange by inputting an information transmission clock having no correlation at all with respect to the system operation clock used within the imaging and recording apparatus from the personal computer to the imaging and recording apparatus.

SUMMARY OF THE INVENTION

In view of the above described points, an object of the present invention is to provide a small-sized imaging and recording apparatus which is capable of preventing false operation and which is excellent in universality and manipulation capability.

The above described object is achieved by an imaging and recording apparatus having a semiconductor memory, apparatus operation start commanding means such as a recording switch, and control means for exercising control so as to write image information signals obtained by imaging into the semiconductor memory in response to an operation start command given by the apparatus operation start commanding means. In accordance with one feature of the present invention, the imaging and recording apparatus includes a first connector for outputting an image information signal stored in the semiconductor memory to the outside of the apparatus or for inputting a signal to be stored in the semiconductor memory to the inside of the apparatus, and state detection means for detecting a first state, i.e., an exchange ready state or exchange execution state of image information with respect to an external device and for detecting a second state, i.e., an operation state for writing an image information signal into the semiconductor memory in response to closure of the recording switch, by detecting the fact that the first connector has been inserted into a second connector provided in the external device or detecting a signal supplied from the external device via the first connector. When the state detection means has detected the above described first state, writing a new image information signal into a semiconductor memory in response to closure of the above described recording switch is inhibited. When the state detection means has detected the above described second state, transition to the state for executing exchange of image information with the external device is inhibited.

Furthermore, in an aspect preferred for improving the manipulation capability of an imaging and recording apparatus according to the present invention, a detection signal obtained when the above described second state has been detected is adapted to be outputted to the above described first connector.

Furthermore, in an aspect allowing various methods using an imaging and recording apparatus according to the present invention, terminals of the first connector are put out on an armoring side face of the apparatus looking toward a direction different from the incidence direction of a picture to be imaged.

The above described state detection means has a switch pressed and closed when the first connector has been inserted into the second connector, for example. This switch outputs an electric signal while these connectors are in the insertion state. Or after the insertion of the connector, a signal inputted from the external device via these connectors at least before execution of exchange of image signals with the external device is detected and an electric signal indicating the first state is outputted. However, while the semiconductor memory is in the write operation mode of image information signals in response to closure of the recording switch, i.e., while the semiconductor memory is in the second state, outputting the above described electric signal from the state detection means is inhibited.

When there is an output electric signal indicating the first state of the state detection means, control is exercised so as to inhibit writing image information signals responsive to closure of the recording switch, in the semiconductor memory to be accessed for exchanging image information signals with the external device.

Even if the user should inadvertently manipulate the recording switch when image information is being exchanged with the external device, contents of images being exchanged are not deformed owing to the operation heretofore described according to the present invention. Furthermore, by providing a buffer memory for temporary storage in a stage preceding the semiconductor memory, for example, and inhibiting image information signals from the buffer memory to be written into the semiconductor memory as described above, picture imaging responsive to manipulation of the recording switch is possible even in the interval of operation of signal exchange with the external device.

When outputting the electric signal indicating the first state from the state detection means is inhibited, i.e., in the second state, the access state of the semiconductor memory selected to write the image information signal in response to closure of the recording switch is maintained and transition to a state allowing access from the external device is inhibited.

Even in the state in which a series of operations for recording the imaged picture are continued, the above described operation according to the present invention makes it possible to execute manipulation for connecting the external device without deforming contents of the picture.

Furthermore, if the semiconductor memory is configured so that an electric signal indicating that the semiconductor memory is in the second state is outputted from the state detection means and the electric signal is used as an apparatus output via the connector, it becomes possible to detect, in an external device connected via the connector, the end of the second state. Therefore, after the end of imaging and recording operation started at timing which is not under time management of the external device by the recording switch or operation start commanding means incorporated in the imaging and recording apparatus of the present invention including a receiving portion of a remote controller using infrared rays or the like, the semiconductor memory can be accessed from the external device immediately or automatically.

Furthermore, in an imaging and recording apparatus according to an aspect of the present invention, the first connector is put out in a direction different from the incidence direction of the optical image of the subject. Thereby, it becomes easy to keep the field of subject view of the imaging and recording apparatus in such a state that the first connector is surely coupled to the second connector possessed by an external device or the like.

Furthermore, in accordance with the present invention, writing an image information signal in response to the recording switch, which is the internal operation of the apparatus, and reading/writing an image information signal, which is the operation of exchanging information with an external device of the apparatus are executed independently in a time-division fashion. There are no temporal restraints imposed upon operation timing between divided operations. By supplying, from the outside of the apparatus, a clock having no correlation with the internal system operation clock of the apparatus, therefore, exchange of image information with the apparatus can be executed.

Other objects, constructions and advantages of the present invention will become apparent from the following detailed description in conjunction with the accompanying drawings.

BRIEF DESCRIPTION OF THE DRAWINGS

FIGS. 12A to 12F are diagrams showing an exterior view and examples of use of an embodiment of an imaging and recording apparatus according to the present invention.

DESCRIPTION OF THE PREFERRED EMBODIMENTS

Figure 1:
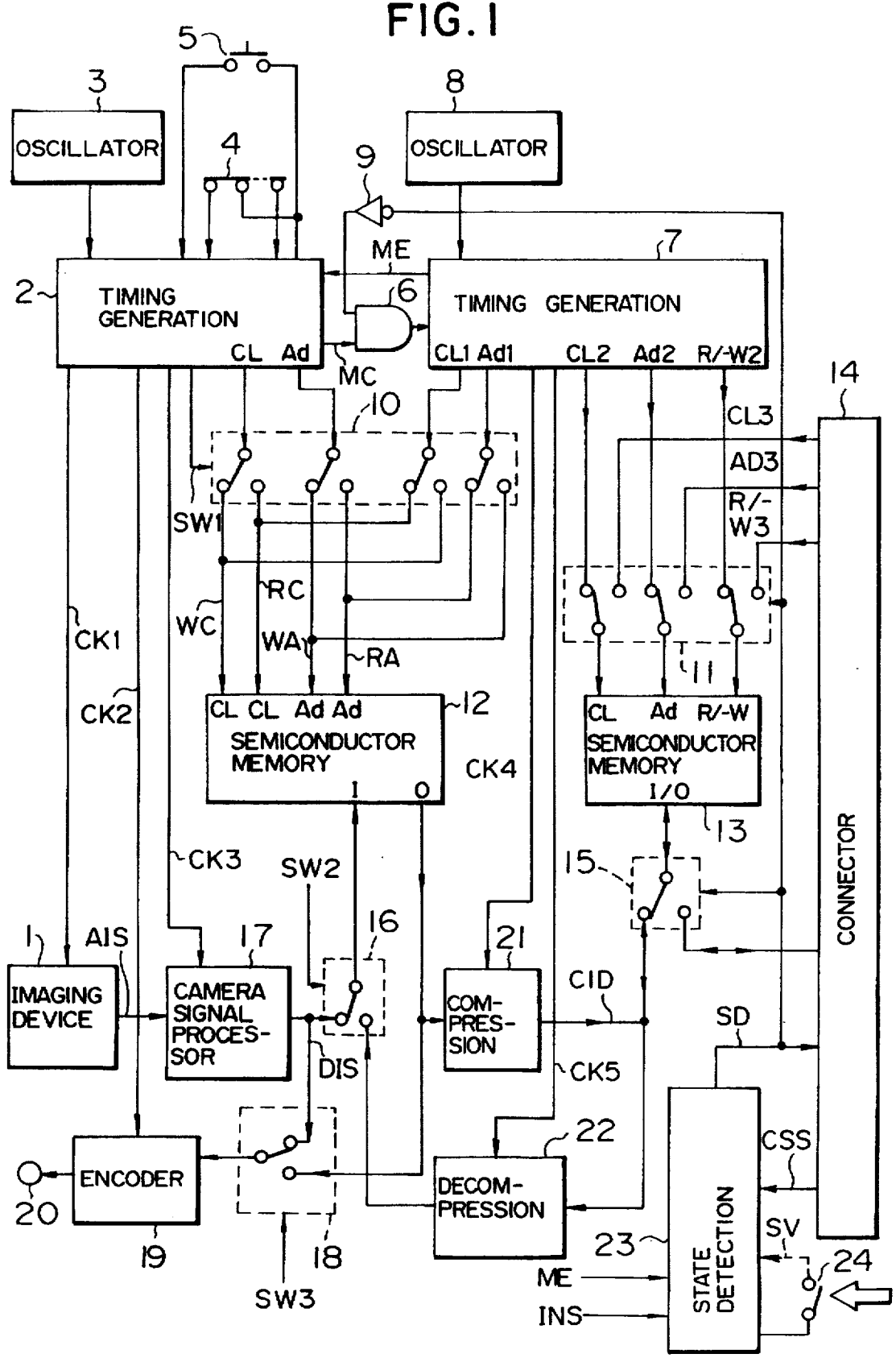
FIG. 1 is a block diagram showing an embodiment of an imaging and recording apparatus according to the present invention.

Embodiments of the present invention will hereafter be described by referring to the drawings.

FIG. 1 is a block diagram showing an embodiment of an imaging and recording apparatus according to the present invention. Numeral 1 denotes an imaging device, 2 a timing generation circuit, 3 an oscillator, 4 a power supply switch, 5 a recording trigger switch, 6 an AND gate, 7 a timing generation circuit, 8 an oscillator, 9 an inverter, 10 and 11 switches, 12 and 13 semiconductor memories, 14 a connector, 15 and 16 switches, 17 a camera signal processing circuit, 18 a switch, 19 an encoder, 20 an output terminal, 21 an image data compression circuit, 22 an image data decompression circuit, 23 a state detection circuit, and 24 a switch.

With reference to FIG. 1, when the user has closed the power supply switch 4, the timing generation circuit 2 formed by a microcomputer or a logic circuit detects this and activates a power supply circuit, which is not illustrated, to supply power to various parts. In addition, the timing generation circuit 2 suitably conducts processing such as frequency division on a first reference frequency signal supplied from the oscillator 3 and thereby generates clock pulses CK1, CK3 and CK2 respectively for operation of the imaging device 1, the camera signal processing circuit 17 and the encoder 19 and switch control signals SW1, SW2 and SW3. In response to these switch control signals SW1, SW2 and SW3, the switches 10, 16 and 18 assume illustrated positions. These switches 10, 16 and 18 can be easily formed by using known multiplexer circuits according to the logic circuit technique.

From the imaging device 1 having an optical lens which is not illustrated and which is attached to a light receiving face thereof, an analog image information signal AIS obtained by conducting photoelectric conversion on an optical image is outputted. The camera signal processing circuit 17 has circuits known in the art of television camera, such as a correlation double sampling circuit, an automatic gain control circuit, a matrix circuit, and a gamma processing circuit. In the middle course of a signal line included in the circuit configuration, an A/D (analog/digital) converter is disposed to output a digitized baseband digital image information signal DIS.

This digital image information signal DIS is supplied to the encoder 19 via the switch 18. From the baseband digital image information signal DIS, a chroma signal modulated into a sub-carrier is generated. The chroma signal is aligned in timing with a baseband luminance signal and a synchronizing signal supplied from the timing generation circuit 2 as a part of the clock pulse CK1. These are combined and outputted from an output terminal 20 as a composite video signal or an independent component signal.

The encoder 19 has a D/A (digital/analog) converter. An image information signal converted into an analog signal is outputted from the output terminal 20. By connecting a known television monitor device to the output terminal 20, continuous (moving picture) images picked up by the imaging device 1 can be displayed on the monitor device as television video images.

Operation heretofore described is similar to that of a known television camera device and can be realized by using a television camera circuit of commercially available model VM-H39 camera integral with VTR produced by Hitachi Ltd., for example.

Operation of the electronic camera function of this embodiment will now be described.

The baseband digital image information signal DIS outputted from the camera signal processing circuit 17 is supplied to the semiconductor memory 12 via the switch 16. Furthermore, at this time, the clock CL and an address signal Ad generated in synchronism with the camera signal processing clock CK3 by the timing generation circuit 2 are supplied to the semiconductor memory 12 via the switch 10 as a write clock WC and a write address signal WA, respectively.

Figure 3A:
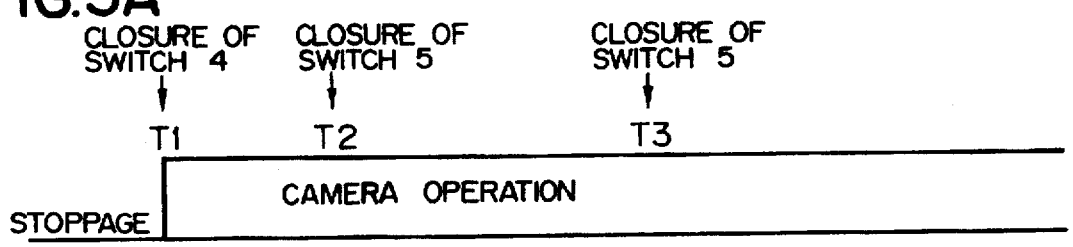
FIGS. 3A–3C are timing charts showing the operation of a semiconductor memory of FIG. 1.
Figure 3B:
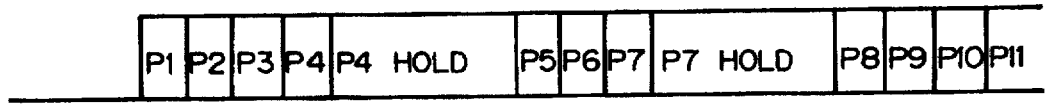
Figure 3C:
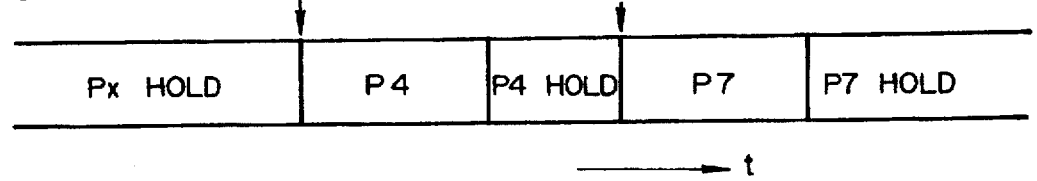

FIGS. 3A to 3B are timing charts showing the operation of the semiconductor memory 12. FIG. 3A shows operation timing of a television camera circuit including the imaging device 1 and the camera signal processing circuit 17. FIG. 3B shows storage timing of the semiconductor memory 12. FIG. 3C shows operation modes of the semiconductor memory 13. In FIG. 3B, P1, P2 and P3 represent succeeding images (field pictures or frame pictures of television signal) in the image information signal DIS. Images written into the semiconductor memory 12 are also represented by the same characters.

With reference to FIGS. 1 and 3, upon closure of the power supply switch 4 at time T1, the television camera circuit starts the above described operation and the image information signal DIS is generated. Each of the semiconductor memories 12 and 13 typically has a memory capacity capable of recording data corresponding to one sheet of field picture or one sheet of frame picture.

Typically, operation for writing image data into the semiconductor memory 12 is executed so that image data written previously may be rewritten with new data by a predetermined amount of data (eight bits, for example) in temporal serial order. In case a natural picture is to be recorded by an electronic camera, a data amount of at least one kbit per sheet of picture is needed. Even after operation for writing data of one sheet of picture has been commenced, image data written previously remain in the semiconductor memory until operation for writing data of this sheet of picture is completed. That is to say, in a time region denoted by P2 in FIG. 3B, for example, only data of a picture P2 is not stored in the semiconductor memory 12, but data of picture P1 previously written and data of the picture P2 to be written this time are mixedly stored.

In the waveform of FIG. 3, the term "hold" as in "P4 hold" means that after writing data of one sheet of picture has been completed the picture data are held as they are without writing new image data (i.e. without rewriting picture data).

After time T1, pictures P1 to P4 generated by the camera signal processing circuit 17 are successively written into the semiconductor memory 12. At each time, image data are updated. If writing data of the picture P4 being written has been completed when the recording trigger switch 5 is closed by the user (time T2), writing next data into the semiconductor memory 12 is inhibited. The semiconductor memory 12 is controlled so that the data of this picture P4 may be held (subjected to image freezing). This control is executed by stopping occurrence of the clock CL in the timing generation circuit 2 at timing of the vertical synchronizing signal of the image information signal AIS. Subsequently, the timing generation circuit 2 generates an operation control signal MC. As described below, this operation control signal MC is supplied to the timing generation circuit 7 via the AND gate 6, which is controlled to open and close according to an output signal SD of the state detection circuit 23. The operation of the timing generation circuit 7 is thus started.

The timing generation circuit 7 conducts suitable processing such as frequency division on a reference signal supplied from the oscillator 8. Thus, the timing generation circuit 7 generates a clock CL1 for driving the semiconductor memory 12, an address signal Ad1, operation clocks CK4 and CK5 respectively for the image data compression circuit 21 and the image data decompression circuit 22, a clock CL2 for driving the semiconductor memory 13 which stores compressed image data CID, an address signal Ad2, and a read/write changeover signal (R/–W2) for changing over between read operation and write operation. The timing generation circuit 7 can be formed by using known logic circuits. The read/write changeover signal (R/–W2) indicates "read" when it is at "H" (high level) and indicates "write" when it is at "L" (low level), for example.

Upon receiving the operation control signal MC, the timing generation circuit 7 starts operation for compressing image data and operation for writing compressed image data CID into the semiconductor memory 13.

Figure 2:
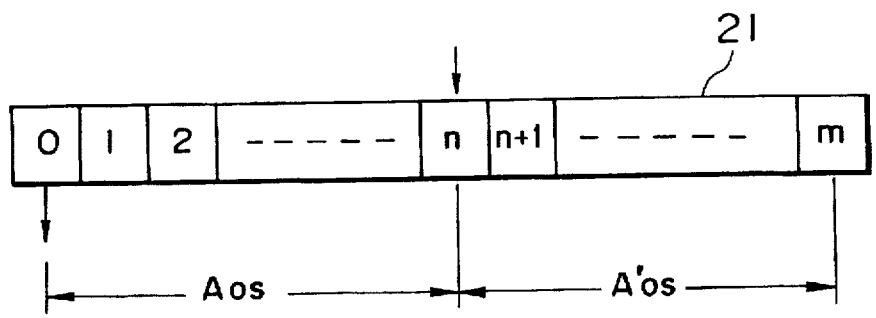
FIG. 2 is a schematic diagram showing a FIFO memory used in a conventional imaging and recording apparatus.

That is to say, the clock CL1 and the address signal Ad1 outputted from the timing generation circuit 7 are supplied to the semiconductor memory 12 via the switch 10 as a read clock RC and a read address signal RA. Thereby, data of the picture P4 stored and held are successively read out from the semiconductor memory 12 and compressed in the compression circuit 21, compressed image data CID being thus obtained. By using a FIFO semiconductor memory as the semiconductor memory 12, it is possible to start data reading of this picture P4 even in the middle course of data writing interval of the picture P4 of FIG. 3B as described with reference to FIG. 2. Furthermore, the write clock WC may not be in synchronism with the read clock RC.

The compressed image data CID outputted from the compression circuit 21 are supplied to a data input/output terminal I/O of the semiconductor memory 13. In addition, the clock CL2, the address signal Ad2, and the read/write changeover signal (R/–W2) indicating "write" outputted from the timing generation circuit 7 are supplied to the semiconductor memory 13 via the switch 11 as a clock CL, an address signal Ad, and a read/write changeover signal (R/–W). During the interval denoted by P4 as shown in FIG. 3C, compressed data of the picture P4 are written into the semiconductor memory 13.

The semiconductor memory 13 is a memory changed over to write mode or read mode of image data by the read/write changeover signal (R/–W). When the read/write changeover signal (R/–W) is "H", the semiconductor memory 13 is in the write mode. When the read/write changeover signal (R/W) is "L", the semiconductor memory 13 is in the read mode. At this time, the data input/output terminal I/O is used for outputting data, and the clock CL and the address signal Ad are used as the read clock and the read address signal, respectively. A semiconductor memory circuit changed over to the write or read mode and used in this way is also known.

In case the size of the apparatus is to be reduced in this embodiment, small-sized LSI circuits are used for the data compression circuit 21 and the data decompression circuit 22. Because of the processing capability of the circuit elements, it takes a longer time to generate compressed data of one sheet of picture than to generate image data of one sheet of picture in the above described camera operation. Therefore, the semiconductor memory 12 is used as a buffer memory to make it possible to pick up images at high speed in camera operation. In addition, at this time, data of the picture P4 are held in the semiconductor memory 12 until the compression of the data of the picture P4 and writing the compressed data into the semiconductor memory 13 are completed, deformation of the picture contents being thus prevented. In order to conduct this operation, closure information of the recording trigger switch 5 is not picked up during a period lasting since the operation control signal MC is outputted from the timing generation circuit 2 until an operation end signal ME is supplied.

With reference to FIG. 3C, the timing generation circuit 7 stops occurrence of the write clock CL2 at the time point when writing compressed data of the picture P4 has been finished. From this time on, the timing generation circuit 7 keeps the semiconductor memory 13 in the hold mode of the data of this picture P4. In addition, the timing generation circuit 7 sends the operation end signal ME to the timing generation circuit 2. Upon receiving the operation end signal ME, the timing generation circuit 2 stops generation of the operation control signal MC, starts write operation into the semiconductor memory 12 again, writes data of pictures P5, P6 and P7 into the semiconductor memory 12 successively, and prepares for the next closure operation of the recording trigger switch 5.

It is conceivable to use a memory having a data storage capacity corresponding to a plurality of sheets of pictures as the semiconductor memory 13. At this time, only a partial area assigned to one sheet of picture, out of the storage area of picture data included in the semiconductor memory 13, is rewritten with new picture data during data write operation intervals denoted by P4, P7 and so on in FIG. 3C. During intervals denoted by "hold" in FIG. 3C, not only picture data written immediately before them but also picture data written before then are also held.

In case the semiconductor memory 13 is a static random access memory backed up by a battery or a non-volatile memory of so-called flash type, for example, data of picture Px, which have been recorded at the time of imaging before imaging at this time started by closure of the power supply switch 4 at time T1, are held before the time point shown in FIG. 3C whereat data of the picture P4 are written.

In FIG. 3, memory operation in case the recording trigger switch 5 is closed again (time T3) during the interval for writing data of the picture P7 into the semiconductor memory 12 is also shown. Operation in this case is also the same as the recording operation of the picture P4, and its description will be omitted.

The operation of the electronic camera function (still picture recording function) of this embodiment has heretofore been described by referring to FIG. 3. This operation is similar to the operation of the apparatus shown in the above described conventional technique references 1 and 2.

In case the semiconductor memory 13 is a memory of flash type, picture image cannot be rewritten by using so-called overwriting because of the device configuration. In a stage before writing data of the picture P4, therefore, operation for once erasing picture data remaining in the memory area assigned as the data writing area of the picture P4 is executed at timing of the picture P4 shown in FIG. 3C. To be concrete, this erasing operation is operation for writing data of a certain predetermined logic level into the semiconductor memory. This can be carried out by disposing on the output side of the data compression circuit 21 of FIG. 1, for example, a logic gate controlled so as to output data of a predetermined level in response to a control signal which is outputted from the timing generation circuit 7 and which is not illustrated and by writing the data of this predetermined level prior to writing data of the picture P4.

As the memory device of flash type, there is also known such a memory device that a code signal supplied to the data input/output terminal I/O is taken into the memory device by using several kinds of control signal and the operation mode is changed over to write, erase, or the like. Furthermore, there is also known such a memory device having a so-called ready/busy signal generation function in erasing or writing operation in order to generate data of a predetermined logic level and thereby give warning against advance to the next operation until the internal operation of the memory device has been completed. Such memory devices may also be used by providing a plurality of changeover signals for the switch 11 as occasion demands and suitably changing over to a control code or picture data as a signal to be supplied to the data input/output terminal I/O by means of a technique known in the field of the digital circuit technique using a semiconductor memory. Furthermore, it is also possible to provide interface circuits conformed to the function of the memory device to be used between the switches 11 and 15 and the semiconductor memory 13 as shown in FIG. 1.

By thus adopting such a configuration that erasing operation may be executed in response to image information signal recording when the semiconductor memory 13 is a memory of flash type, the user can manipulate it with a feeling similar to that of a conventional memory device allowing automatic rewriting using overwriting, without being troubled by the erasing operation inherent in memories of flash type.

In accordance with a feature of this embodiment, the connector 14, the switches 11 and 15, the state detection circuit 23 for detecting the ready state of operation for exchanging signals with an external device, and the AND gate 6 for preventing operation start of the timing generation circuit 7 are provided so that digital image information signals may be exchanged between an external device and the semiconductor memories 12 and 13.

Figure 4:
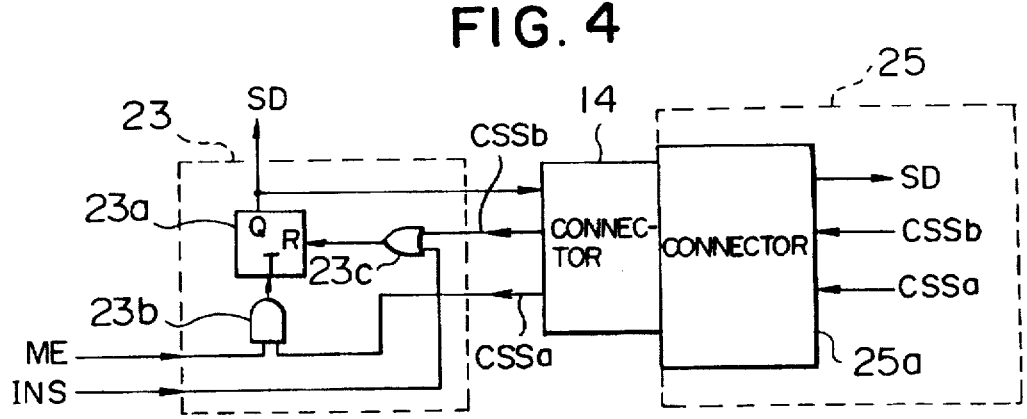
FIG. 4 is a block diagram showing a concrete example of a state detection circuit of FIG. 1.
Figure 5:
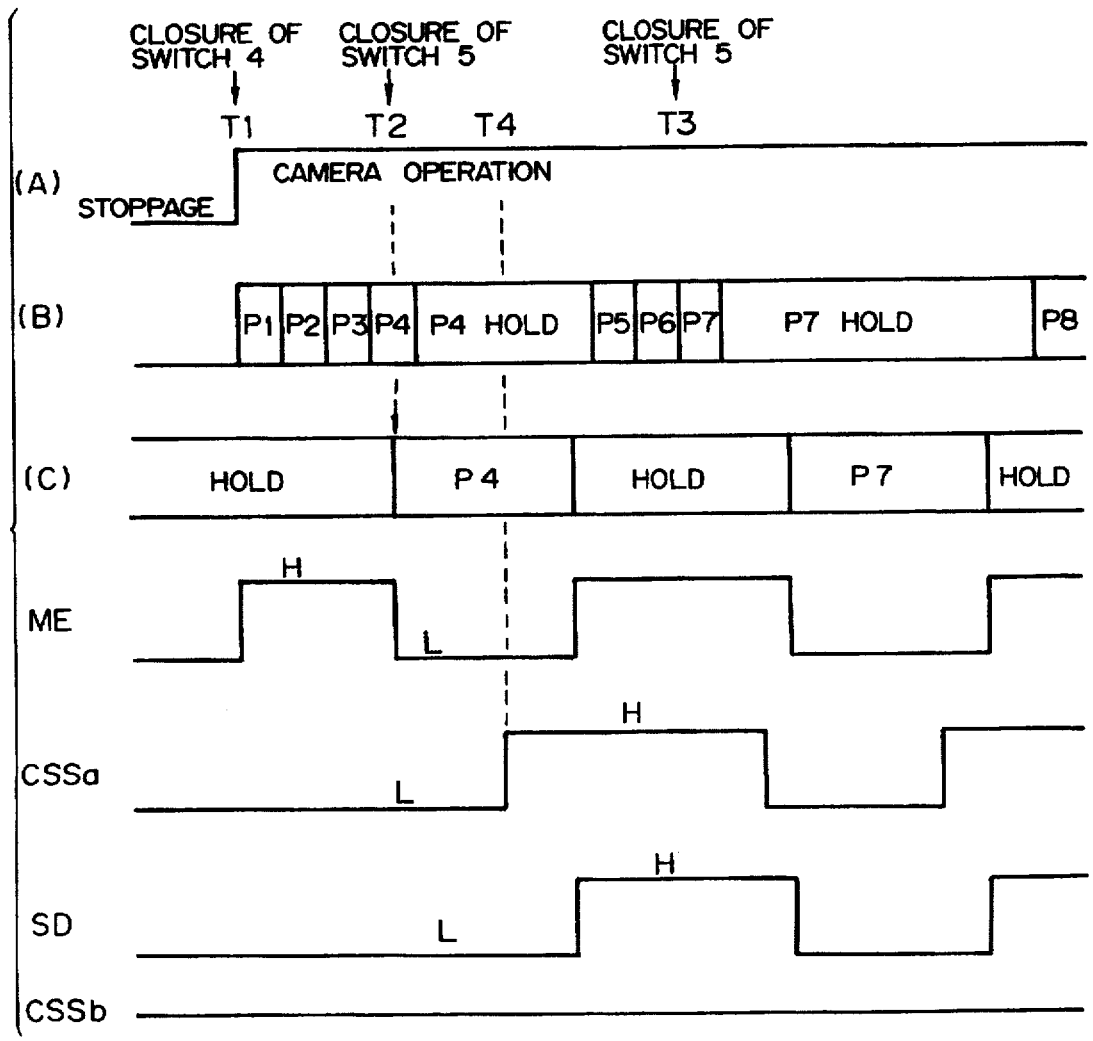
FIG. 5 is a timing chart showing a function of exchanging signals with an external device in the embodiment shown in FIG. 1 and showing the operation of the state detection circuit shown in FIG. 4.

This point will hereafter be described by referring to FIGS. 4 and 5. FIG. 4 is a block diagram showing one concrete example of the state detection circuit 23 in such a state that an external device is connected to the connector 14 of FIG. 1. In FIG. 4, 23a denotes a T-FF (T flip-flop), 23b an AND gate, 23c an OR circuit, 25 an external device, and 25a a connector. Components corresponding to those of FIG. 1 are denoted by like characters.

FIG. 5 is a timing chart for describing the signal exchange function with the external device. Signals corresponding to those of FIG. 4 are denoted by like characters. Time slots (A), (B) and (C) of FIG. 5 are the same as FIGS. 3A, 3B and 3C, respectively.

With reference to FIGS. 1 and 5 first of all, picture data already recorded are held in the semiconductor memory 13 and the timing generation circuit 7 has stopped its operation at the time T1 whereat the power supply switch 4 is activated, as described before. Therefore, the operation end signal ME is at an "H" level, the operation end state being thus indicated. At time T2, the recording trigger switch 5 is closed. By a series of operations described before, operation for writing data of the picture P4 into the semiconductor memory 13 as represented by the time slot (C) of FIG. 5 is started. Thereby, the level of the operation end signal ME becomes "L", indicating that the timing generation circuit 7 is operating.

With reference to FIGS. 4 and 5, the operation end signal ME is supplied to the AND gate 23b of the state detection circuit 23 as one of inputs thereof. The other input of the AND gate 23b is a signal CSSa (hereafter referred to as ready situation indication signal) indicating the ready situation of signal exchange operation, which is supplied from the external device 25 via the connectors 25a and 14 when the connector 25a of the external device 25 is coupled to the connector 14 for connection of the external device. The output of this AND gate 23b is supplied to a clock terminal T of the T-FF 23a as a trigger clock.

To a reset terminal R of this T-FF 23a, an initial reset signal INS obtained when the operation power supply is activated by the power supply switch 4 (FIG. 1) is supplied via the OR gate 23c. This initial reset signal INS is generated during a predetermined minute time after the power supply has been coupled. The initial reset signal INS is used to reset respective logic circuits to predetermined initial states. This reset technique is a method well known in the field of logic circuit technique, and a specialized IC for generating a reset signal when power has begun to be supplied is also commercially available. Therefore, such a reset signal generating IC may be provided as a component of the state detection circuit 23. Alternatively, the output signal of a reset signal generating circuit provided in the timing generation circuit 2 may be used as the initial reset signal INS.

The Q output of the T-FF 23a is outputted as a state detection signal SD. As shown in FIG. 5, this state detection signal SD is reset from an indefinite state (indefinite state of "H" or "L") to the "L" state at time T1 by the initial reset signal INS. When the state detection signal SD is in the state "L", the switches 11 and 15 shown in FIG. 1 are in states illustrated in FIG. 1. This state detection signal SD assuming the state "L" is inverted by the inverter 9 of FIG. 1, resulting in the "H" state. Thus the AND gate 6 passes the operation control signal MC. As described before with reference to FIG. 3, therefore, data of the picture P4 are written into the semiconductor memory 13 in response to closure of the recording trigger switch 5 at time T2.

It is now assumed that the ready situation indication signal CSSa of "H" indicating that the preparation of signal exchange has been completed in the external device 25 is supplied from the external device 25 to the state detection circuit 23 at time T4. In keeping with the end of operation of the timing generation circuit 7 caused by completion of operation for writing data of the picture P4 into the semiconductor memory 13, the operation end signal ME changes to "H." At this timing, the T-FF 23a is triggered. As a result, the state detection signal SD is inverted to "H."

When the state detection signal SD turns "H," the switches 11 and 15 of FIG. 1 are changed over to positions opposite to those illustrated. As well known in the art, the switch 11 serving as unidirectional digital signal switches can be easily implemented by multiplexer circuits, for example, and the switch 15 serving as a bidirectional switch can be easily implemented by using a so-called analog switch circuit, for example.

The state detection signal SD is supplied to the external device 25 via the connectors 14 and 25a. By means of the "H" level, the state detection signal SD informs the external device 25 of the fact that the imaging and recording apparatus is ready to exchange signals.

Upon receiving this state detection signal SD, the external device 25 shown in FIG. 1 supplies a clock CL3, an address signal Ad3, and a read/write changeover signal (R/–W3) for ordering readout to the semiconductor memory 13 via the switch 11. Thereupon, the semiconductor memory 13 reads out image data corresponding to one particular sheet of picture, for example, or every picture data from a storage area specified by this address signal Ad3. The data thus read out are supplied from the data input/output terminal I/O to the external device 25 (FIG. 4) via the switch 15 and the connector 14. At this time, operation of the semiconductor memory 13 is controlled exclusively by the external device 25.

With reference to FIGS. 4 and 5, upon reading desired image data from the semiconductor memory 13, the external device 25 stops output of the clock CL3, restores the ready situation indication signal CSSa to "L." At the same time, the external device 25 supplies an exchange operation end signal CSSb to the state detection circuit 23. This exchange operation end signal CSSb is supplied to the T-FF 23a via the OR gate 23c. As a result, the T-FF 23a is reset and the state detection signal SD is restored to "L."

In case the external device 25 is a personal computer, a signal of a comparatively low frequency is often used as the clock CL3 for signal exchange (FIG. 1). It is convenient that the frequency can be determined by only the restraint condition of the external device 25 alone. In general, in case a low cost one is used as the external device 25, its data processing capability is low and hence signal exchange using a low-frequency clock is suitable. If an external device having high processing capability is used, it is desired that the exchange operation is completed in a short time by using a high-speed clock. This is the reason why it is desired that the frequency can be determined by only the restraint condition of the external device 25 alone. Therefore, it is conceivable that the time required for signal exchange with the external device 25 differs depending upon the kind of the external device in use even if the amount of exchanged signal data is the same.

In this embodiment, the state detection signal SD is supplied also for controlling the AND gate 6 inserted in the transmission path of the operation control signal MC, which commands operation start of the timing generation circuit 7. When the state detection signal SD is "H," the operation control signal MC is blocked by this AND gate 6. Among successive operations of writing image data into the semiconductor memories 12 and 13 executed by closure of the recording trigger switch 5, at least writing new image data into the semiconductor memory 13 is inhibited. A change of image data in the semiconductor memory 13 and hence deformation of image contents are thus prevented during the indefinite time required for exchange of signals with the external device 25.

FIG. 5 illustrates operation of the embodiment having the above described configuration. The timing generation circuit 2 can be implemented by using a technique known in the field of logic circuit technique so that closure of the recording trigger switch 5 may be disregarded when the state detection signal SD is "H." Image data can thus be prevented from being changed in the semiconductor memory 13. As a matter of course, however, every operation caused by manipulation of the recording trigger switch is inhibited in this case.

With reference to the time slot C of FIG. 5, the operation for writing the picture P4 in the semiconductor memory 13 is completed and the operation end signal ME is inverted to "H." As described with reference to FIG. 3, operation for writing the pictures P5, P6 and P7 into the semiconductor memory 12 is then resumed (time slot B of FIG. 5). If the recording trigger switch 5 is closed at time T3, the picture P7 is held in the semiconductor memory 12. Since the state detection signal SD is "H," however, the operation control signal MC is blocked by the AND gate 6 and it is not supplied to the timing generation circuit 7. The timing generation circuit 7 does not start its operation. Therefore, the semiconductor memory 13 is inhibited from writing data of the picture P7 therein, and previous data remain held.

In this way, not only changeover operation of the switches 11 and 15 but also the operation of the timing generation circuit 7 is inhibited. Wasteful operation of the circuit can thus be eliminated, and power dissipation can be suppressed.

When operation for reading data of the picture P4 into the external device 25 is completed and the state detection signal SD outputted from the state detection circuit 23 is changed to "L" by the exchange operation end signal CSSb, the switches 11 and 15 are changed over to positions illustrated in FIG. 1 again. In addition, the AND gate 6 is enabled and the operation control signal MC is supplied to the timing generation circuit 7. Thereby, the timing generation circuit 7 starts its operation and the operation end signal ME turns "L" and compressed data of the picture P7 are written into the semiconductor memory 13 at timing illustrated in the time slot C of FIG. 5. When this writing has been finished, the operation end signal turns "H" again and the ready situation indication signal CSSa turns "H" again to indicate that the external device is ready to exchange signals. Thereby, the state detection signal SD is inverted to "H" to inform the external device 25 of the fact that the imaging and recording apparatus becomes ready to exchange signals again.

According to the operation of this embodiment as heretofore described, writing data into the semiconductor memory 13 is inhibited while data are being read from the semiconductor memory 13 into the external device 25. Or reading data into the external device 25 in the middle course of writing data into the semiconductor memory 13 is inhibited. Therefore, there is no fear that picture data in the semiconductor memory 13 may be rewritten while operation for reading data of the semiconductor memory 13 into the external device 25 is being executed. Therefore, mixed output of data of a plurality of sheets of pictures instead of data of one sheet of imaged picture can be prevented. As a result, the picture reproduced by using the output data can be prevented from being deformed to yield a picture different from one sheet of imaged picture.

In such a configuration that the output of the operation control signal MC is kept waiting, it is possible to take image data in the semiconductor memory 12, i.e., execute imaging by manipulation for closing the recording trigger switch 5 even while readout of data into the external device 25 is being executed. Furthermore, upon completion of data readout into the external device 25, image information thus taken in can be automatically transferred to the semiconductor memory 13 and recorded therein without needing new manipulation performed by the user. Furthermore, when data writing into the semiconductor memory 13 has been completed, the state detection signal SD is automatically inverted to "H" in response thereto, and the imaging and recording apparatus of this embodiment is changed over to the state allowing signal exchange with the external device 25. In addition, the connected external device 25 can be informed of the fact that the apparatus is in this state. Therefore, image data recorded in the semiconductor memory 12 can be read out continuously by the external device 25 with a shortened waiting time.

Furthermore, the ready situation indication signal CSSa is not limited to the level change timing as shown in FIG. 5. For example, the ready situation indication signal CSSa may be inverted to "H" once and thereafter kept at this level. At this time, every time operation of writing new image information in the time slot C of FIG. 5 is completed and the operation end signal ME is inverted from "L" to "H," the apparatus is automatically brought to such a state that signal exchange with the external device 25 is possible.

Furthermore, in case the ready situation indication signal CSSa is prescribed so as to return to "L" from "H" every time signal exchange with the external device 25 is finished as shown in FIG. 5, the exchange operation end signal CSSb need not necessarily be supplied from the external device 25. In an alternative configuration, a known logic circuit configuration, such as a monostable multivibrator circuit, for generating a pulse signal having a predetermined pulse width in synchronism with edge timing of the ready situation indication signal CSSa inverted from "H" to "L," for example, is incorporated in the state detection circuit 23. The ready situation indication signal CSSa is supplied to the logic circuit configuration to obtain a pulse signal corresponding to the exchange operation end signal CSSb.

With reference to FIG. 5, it is now assumed that the ready situation indication signal CSSa is inverted to "H" during the "H" interval of the operation end signal ME. In this case, the state detection circuit 23 immediately outputs the state detection signal SD of H. The imaging and recording apparatus of this embodiment is brought to the state of signal exchange with the external device 25. In particular, when the ready situation indication signal CSSa is inverted from "L" to "H" immediately before the operation end signal ME is changed over from "H" to "L" in response to closure of the recording trigger switch 5, a noise signal having a minute pulse width is generated from the AND gate 23b shown in FIG. 4. There is a fear that the T-FF 23a may be triggered thereby and the state detection signal SD may be inverted to "H." Furthermore, when the ready situation indication signal CSSa is inverted to "H" before the time T1 or around the time T1, there is a fear that operation of the T-FF 23a may become indefinite because of competition with reset control of the T-FF 23a exercised by the initial reset signal INS.

Figure 6:
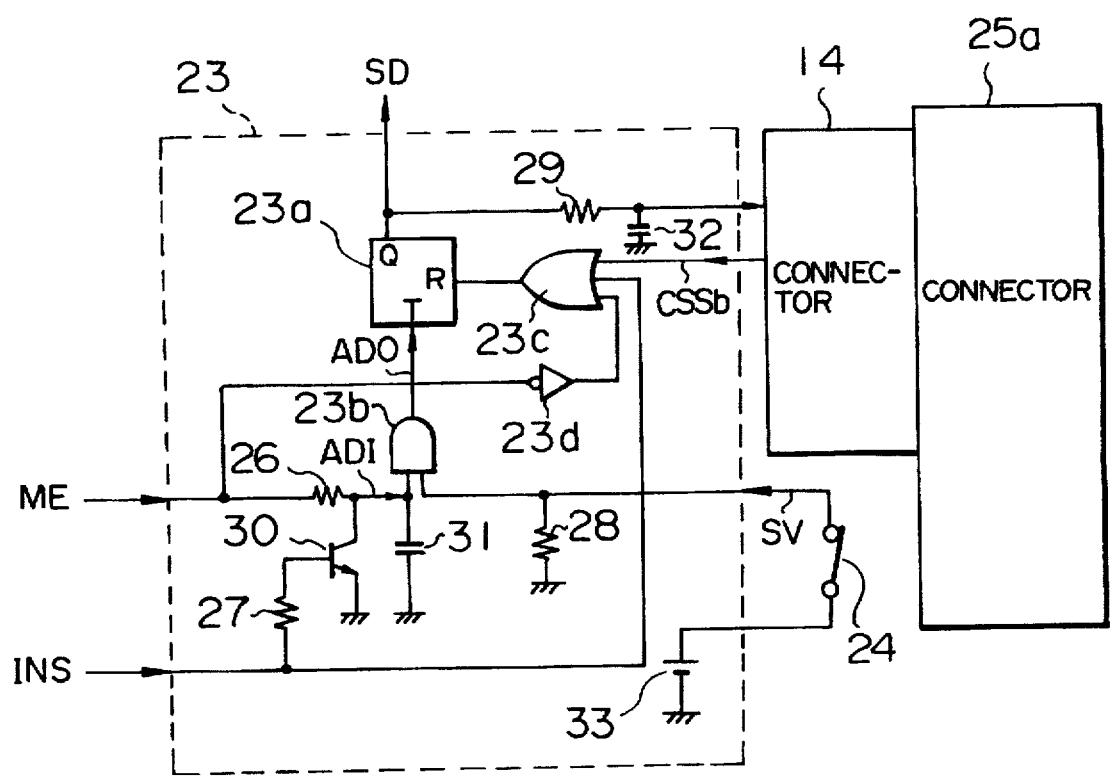
FIG. 6 is a block diagram showing another concrete example of the state detection circuit of FIG. 1.

FIG. 6 is a circuit diagram showing another embodiment of the state detection circuit 23 of FIG. 1 which is suitable for such a case as well. In FIG. 6, 23d denotes an inverter, 26 to 29 resistors, 30 a transistor, 31 and 32 capacitors, and 33 a power supply. Components corresponding to those of FIGS. 1 and 4 are denoted by like characters.

Figure 7A:
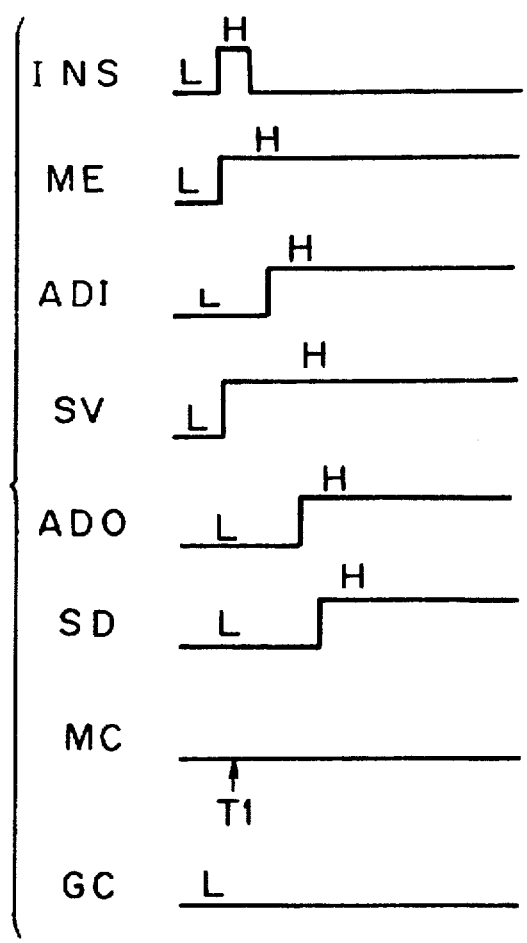
FIGS. 7A and 7B are timing charts showing the operation of the state detection circuit illustrated in FIG. 6.
Figure 7B:
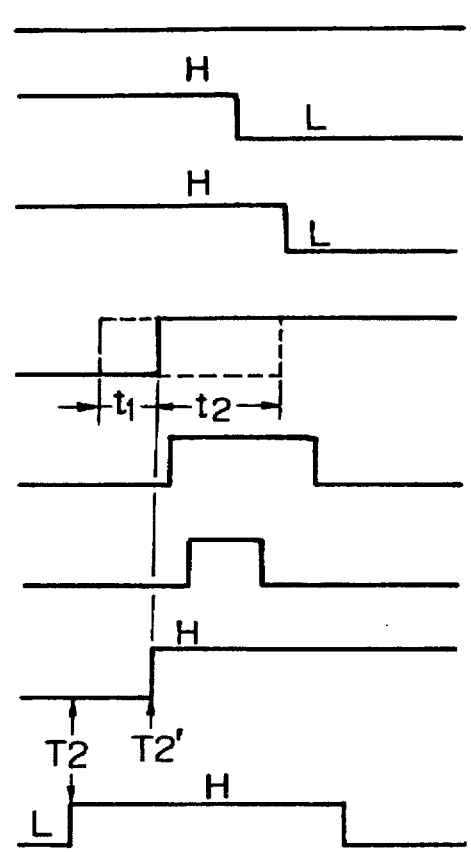

FIGS. 7A and 7B are waveform diagrams showing signals of various locations in FIG. 6. Signals corresponding to those of FIG. 6 are denoted by like characters.

With reference to FIG. 6, an insertion detection switch 24 is provided in the state detection circuit 23. When a connector 25a of an external device (not illustrated) is coupled to the connector 14 (at time T1), this insertion detection switch 24 is pressed to close. As a result, a voltage signal SV of "H" fed from the power supply 33 is supplied to the AND gate 23b. This voltage signal SV of "H" serves as the ready situation indication signal CSSa of the concrete example shown in FIG. 4. A resistor 28 functions to keep one of inputs of the AND gate 23b at the ground ("L") level when the insertion detection switch 24 is closed.

If power is supplied to the apparatus by closure of the power supply switch 4 of FIG. 1 with the connector 25a coupled to the connector 14 as shown in FIG. 7A, therefore, it becomes equivalent to inversion of the ready situation indication signal CSSa from "L" to "H" at the time T1 as described with reference to FIG. 5.

Furthermore, in this concrete example, the operation end signal ME is supplied to the AND gate 23b via the resistor 26 as the other input thereof. Between this input terminal of the AND gate 23b and the ground, the capacitor 31 and the transistor 30 are connected in parallel. The initial reset signal INS is supplied to the base of this transistor 30 via the resistor 27.

If the initial reset signal INS of "H" is generated when power is turned on as shown in FIG. 7A, the transistor 30 becomes conductive during the duration of the signal. Therefore, the level ADI of the input of the AND gate 23b whereat the operation end signal ME is supplied is kept at "L." When a predetermined time has elapsed, the initial reset signal INS turns "L" and the transistor 30 becomes nonconductive. If the operation end signal ME is "H" at this time, the input level ADI turns "H" after a time delay determined by a time constant of the resistor 26 and the capacitor 31. During this time delay, the T-FF 23a is reset by the initial reset signal INS. By output ADO of the AND gate 23b having a level "1" obtained by the input level ADI turning "H", therefore, the T-FF 23a can be surely triggered to generate the state detection signal SD.

FIG. 7B shows operation in case there is a competition in timing between the operation control signal MC of "H" outputted at time T2' by operation of the timing generation circuit 2 in response to closure manipulation of the recording trigger switch 5 (FIG. 1) performed at time T2 and the voltage signal SV of "H" supplied from the power supply 33 to the AND gate 23b in response to closure of the insertion detection switch 24.

The timing generation circuit 7 (FIG. 1) starts its operation in response to the operation control signal of "H" generated from the timing generation circuit (FIG. 1) at time T2'. The operation end signal ME is thus inverted from "H" to "L." As a result of operation delay depending upon the signal propagation speed of circuit components, or phase relationship between the operation clock of the timing generation circuit 7 supplied from the oscillator 8 and the operation control signal MC, there typically occurs a time difference between the time T2' and the time when the operation end signal ME is inverted to "L" thereafter. If the voltage signal SV supplied from the insertion detection switch 24 is inverted from "L" to "H" during the interval of this time difference, an output signal ADO having an impulsive "H" is generated from the AND gate 23b for only a short time. If the T-FF 23a is triggered by this output signal ADO, the state detection signal SD is inverted to "H." If it is left intact, the switches 11 and 15 (FIG. 1) are connected to the access side of the external device although the timing generation circuit 7 is operating. Therefore, image data picked up at time T2 cannot be stored in the semiconductor memory 13 (FIG. 1).

Therefore, the concrete example shown in FIG. 6 has the following configuration in order to avoid such a situation that imaging becomes invalid.

That is to say, the OR circuit 23c is supplied with not only the exchange operation end signal CSSb and the initial reset signal INS as in the concrete example shown in FIG. 4 but also the operation end signal ME inverted in level by the inverter 23d. At time when the operation end signal ME is inverted to "L," the T-FF 23a is adapted to be reset thereby. The state detection signal SD once inverted to "H" is adapted to be returned to "L." As a result, operation for writing image information into the semiconductor memory 13 can be conducted effectively by the operation of the timing generation circuit 7.

At this time, the state detection signal SD having an impulsive waveform of "H" as shown in FIG. 7B is generated under the condition that the voltage signal SV supplied from the insertion detection switch 24 is inverted to "H" within a time region around the time T2' prescribed by the sum of t1 and t2. The time t1 is a circuit operation delay time from the time when the voltage signal SV supplied from the insertion detection switch 24 is inverted to "H" until the AND gate 6 (FIG. 1) is closed by the state detection signal SD. The time t2 is a delay time from the time when the operation control signal MC is inverted to "H" until the T-FF 23a is reset by the operation end signal ME of "L." At this time, the time values t1 and t2 can be predicted beforehand on the basis of the speed performance of circuit components in use or the adopted circuit configuration. The interval of "H" of the state detection signal SD shown in FIG. 7B is shorter than the interval (t1+t2).

By providing a circuit configuration for preventing output of a signal having duration shorter than a predetermined pulse width in the output portion of the state detection signal SD to the connector 14, therefore, the state detection signal SD having impulsive "H" as shown in FIG. 7B can be prevented from being supplied to the external device. In FIG. 6, an integration circuit having a resistor 29 and a capacitor 32 is used as such prevention means. As a matter of course, other configurations implementing a similar function are also known in the field of the logic circuit technique. The external device may be configured so that the external device may not be respond to the state detection signal SD having a minute pulse width supposed beforehand, even if such an impulsive state detection signal SD is supplied to the external device as it is. However, if the state detection circuit 23 is configured so as to prevent such an impulsive state detection signal SD as described above, the restraint imposed upon the operation of the external device can be reduced and trouble for setting an operation program in the external device can be reduced.

As still another concrete example of the state detection circuit 23, a gate may be provided on the resistor 28 side of the insertion detection switch 24 shown in FIG. 6, and the gate may be controlled by a gate signal GC shown in FIG. 7B so as to block the voltage signal. This gate signal GC is generated by the timing generation circuit 2 so as to turn "H" at time T2 when the recording trigger switch 5 is closed, i.e., a predetermined time before the operation control signal MC and return to "L" when a predetermined time has elapsed after the inversion of the operation end signal ME to "L." During the "H" interval of this gate signal GC, the voltage signal SV supplied from the insertion detection switch 24 is blocked and is not supplied to the AND gate 23b. The voltage signal SV supplied from the insertion detection switch 24 is inhibited from being inverted to "H" in a time region (t1+t2) of FIG. 7B. In this case, the output signal ADO of the AND gate 23b and the "H" state of the state detection signal SD shown after the time T2' of FIG. 7B are not generated. Therefore, it becomes unnecessary to supply the inverted signal of the operation end signal ME to the OR circuit 23c.

The state detection circuit 23 shown in FIGS. 4 and 6 and the AND gate 6 and the inverter 9 shown in FIG. 1 are formed by using hardware logic circuits. Alternatively, a microcomputer may also be used. In this case, the microcomputer detects the state on the basis of the initial reset signal INS, the operation end signal, the voltage signal SV, the gate signal GC, and the exchange operation end signal CSSb. On the basis of the result of state detection, the microcomputer generates the operation control signal MC and the state detection signal SD.

Imaging operation and operation for outputting image information to the external device of the embodiment shown in FIG. 1 have heretofore been described. Image reproduction operation of this embodiment will now be described by referring to an operation time chart shown in FIG. 8.

In this operation, the power supply switch 4 is changed over to a position indicated by a broken line opposite to the position illustrated in FIG. 1. As a result, changeover to the reproduction mode is made. Furthermore, in this case, the recording trigger switch 5 is configured so as to have a function of a progressive selection switch for reproduced images. Such function changeover can be easily implemented by using a microcomputer or a logic circuit technique.

Figure 8:
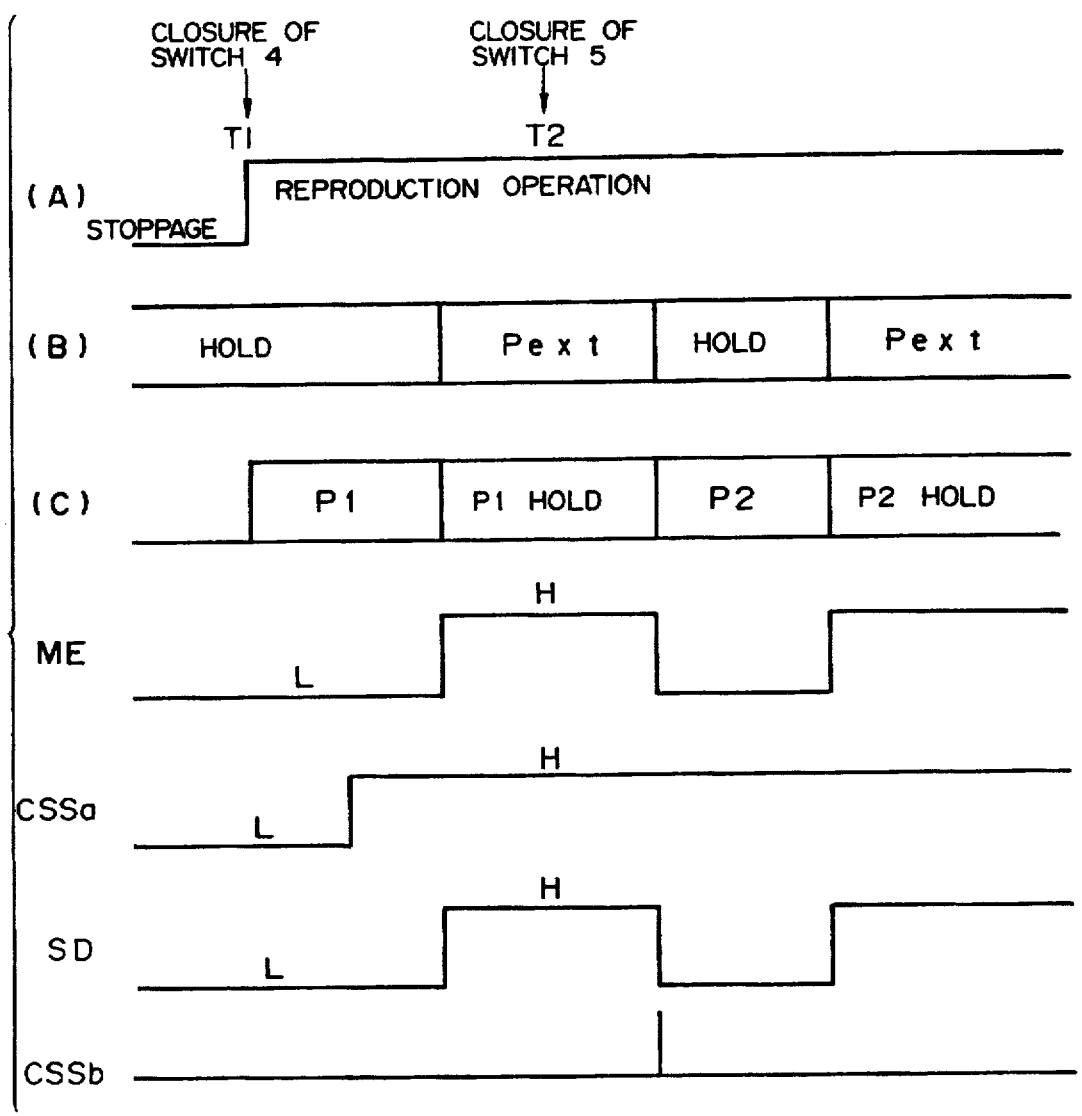
FIG. 8 is a timing chart showing image reproducing operation of the embodiment shown in FIG. 1.

With reference to FIGS. 1 and 8, the user closes the reproduction mode side of the power supply switch illustrated by a broken line at time T1. Thereupon, power of the operation power supply is supplied. In addition, reproduction operation is started as indicated by an operation waveform A of FIG. 8. At this time, data of the picture P1 of the first sheet are read out from the semiconductor memory 13 in the image data hold state as the initial operation as represented by a time slot B of FIG. 8. The data thus read out are written into the semiconductor memory 12 as represented by a time slot C of FIG. 8. Such an initial operation is executed as hereafter described.

Upon closure of the power supply switch 4, the timing generation circuit 2 starts the reproduction operation. The microcomputer included in the timing generation circuit 2 is programmed beforehand so as to conduct the following initial operation at this time. That is to say, the timing generation circuit 7 is activated by the operation control signal MC to generate the clock CL2, the address signal Ad2, and the read/write changeover signal (R/–W2) of "L" indicating the read operation. Furthermore, an operation clock CK5 of the image data decompression circuit 22 for restoring uncompressed image data from compressed image data, and the clock CL1 and the address signal Ad1 for the semiconductor memory 12 are generated. In addition, the switches 10, 16 and 18 are changed over to positions opposite to illustrated positions by the switch control signals SW1, SW2 and SW3, respectively. By start of the initial operation in the timing generation circuit 7, the operation end signal ME is kept at "L" at time T1.

Even if access ready state from the external device to the semiconductor memory 13 is indicated as shown in FIG. 8 by the ready situation indication signal CSSa shown in FIGS. 4 and 5, the state detection signal SD is prevented from being inverted to "H" by action of the AND gate 23b shown in FIG. 4 or FIG. 6. Therefore, the switches 11 and 15 keep the states shown in FIG. 1. Image data are read out from the input/output terminal I/O of the semiconductor memory 13 and subjected to processing in the image data decompression circuit 22. Thereafter, the image data are supplied to the semiconductor memory 12 via the switch 16. At this time, the clock CL1 and the address signal Ad1 fed from the timing generation circuit 7 are supplied to the semiconductor memory 12 as the write clock WC and the write address signal WA, respectively.

The initial operation in the reproduction mode has heretofore been described. Operation for reading image data from the semiconductor memory 12 will now be described.

In this case, the clock CL and the address signal Ad outputted from the timing generation circuit 2 are supplied to the semiconductor memory 12 as the read clock RC and the read address signal RA, respectively. This data readout is performed so as to scan the data area corresponding to a field picture or a frame picture with the scanning speed of the television signal.

The image data read out from the semiconductor memory 12 are supplied to the encoder circuit 19 via the switch 18, converted into an analog video signal, and outputted from the output terminal 20.

In general, supply of operation power is stopped by supply stoppage of the power supply. In the semiconductor memory 12 which is not backed up in power supply, false data having indefinite levels are stored at time T1 when supply of power is started. With reference to FIG. 8, therefore, the false data are successively replaced by data of the picture P1 at the time of data writing operation of the picture P1.

Processing for restoring data of one sheet of picture in the image data decompression circuit 22 is subject to restraint imposed by the operation speed, for the reason of processing capability similar to that of the image data compression operation as described above. In general, therefore, the time required for restoring data of one sheet of picture in the image data decompression circuit 22 becomes longer than the time required for reading out image data of one sheet from the semiconductor memory 12 by using the clock CL and the address signal Ad supplied from the timing generation circuit 2. If data readout from the semiconductor memory 12 is immediately started at time T1 by using the clock CL and the address signal Ad supplied from the timing generation circuit 2 and a video signal is generated in the encoder 19 from the image data thus read out, therefore, then a false image which often forms a mosaic pattern according to the above described false data is first reproduced on a display device such as a television monitor device connected to the output terminal 20. Successively, the false image is gradually replaced by the image according to data of the picture P1 decompressed by the image data decompression circuit 22, commencing with the upper left corner, for example, of the displayed image. Such an image display is performed.

It is also possible to adopt such a configuration that the video signal according to false data at the time of rewriting is prevented from being outputted and a portion of the screen where rewriting is not finished is displayed with gray, for example. Such a configuration can be implemented by knowing, on the basis of the situation of the address signal Ad1 supplied from the timing generation circuit 7, the recording area of the semiconductor memory 12 replaced by the restored data and keeping the input level of the encoder 19, for example, at a predetermined value at timing when image data from other areas are outputted from the semiconductor memory 12. Furthermore, supply of power is not stopped. At the time of update of reproduced image successively performed, such a display that the image previously selected is gradually replaced by a newly selected image is made.

As evident from the description heretofore given, image information outputted from the output terminal 20 has an interval having a mixture of a plurality of sheets of pictures. However, the television monitor device connected to the output terminal 20 is not a device used for taking out one particular sheet of picture. Therefore, transitionally outputting mixed pictures poses no problem. Rather, it is often more desirable to be able to display, on the monitor display, how the image is updated because operation situation of the apparatus can be grasped.

When operation for writing data of the picture P1 into the semiconductor memory 12 is finished, the timing generation circuit 7 stops generation of the clock CL1 and the clock CL2. The semiconductor memory 12 is brought to the hold mode of data of the picture P1. Readout operation of the semiconductor memory 12 is stopped. Furthermore, the timing generation circuit 7 outputs the operation end signal ME of "H."

In case at this time the ready situation indication signal CSSa is "H" as shown in FIG. 8 to indicate the ready state of signal exchange with the external device, then the state detection circuit 23 generates the state detection signal SD of "H." Thereby, the switches 11 and 15 are changed over to positions opposite to position illustrated in FIG. 1 to allow the external device connected to the connector 14 to access the semiconductor memory 13.

From the external device, the clock CL3, the address signal Ad3, and the read/write changeover signal (R/–W3) of "L" indicating the data writing are supplied. Furthermore, data of a picture Pext are supplied from the external device to the semiconductor memory 13 via the switch 15. As a result, data of one sheet of picture or a plurality of sheets of pictures can be written into the semiconductor memory 13 at timing denoted by Pext shown in the time slot B of FIG. 8. Furthermore, if the ready situation indication signal CSSa remains "L" unlike the case of FIG. 8 after the operation for writing the picture P1 as represented by the time slot C of FIG. 8 has been finished, both the semiconductor memories 12 and 13 are in the data hold state. If under this state the recording trigger switch 5 is closed at time T2 and selection of the next picture is ordered, then the timing generation circuit 2 immediately outputs the operation control signal MC and operation for writing a picture P2 into the semiconductor memory 12 is executed.

In this embodiment, the output of the operation control signal MC can be reserved in the same way as the above described imaging operation while the state detection signal SD is in the "H" state even in the reproduction operation. When the state detection signal SD has turned "H" before the time T2 in FIG. 8, therefore, the semiconductor memory 12 is kept in the data hold state until the exchange operation end signal CSSb indicating the end of the signal exchange operation is supplied from the external device and the state detection signal SD is returned to "L." If the state detection signal SD is inverted to "L," operation for writing the picture P2 into the semiconductor memory 12 can be automatically executed. If the picture P2 is replaced by another picture by rewriting in the semiconductor memory 13 at prior timing of Pext, then the picture after rewriting is written into the semiconductor memory 12.

In case signal exchange with the external device is not performed in the connection state of the external device, it is a matter of course that it suffices to keep the ready situation indication signal CSSa at "L." In case the voltage signal SV fed from the insertion detection switch 24 is used instead of the ready situation indication signal CSSa as in the state detection circuit 23 shown in FIG. 6, the exchange operation end signal CSSb is sent back from the external device whenever the state detection signal of "H" is transmitted via the connector 14. Thereby, the state detection signal SD immediately returns to "L" and the apparatus is thus ready to start operation in response to closure of the recording trigger switch 5. As a result, selection of a reproduced image responsive to manipulation of the recording trigger switch 5 can be effected without hindrance.

According to the image reproduction operation of this embodiment as heretofore described, operation for writing data fed from the external device into the semiconductor memory 13 is inhibited while image data are being read out from the semiconductor memory 13 in order to write the reproduced image data into the semiconductor memory 12. While operation for writing data fed from the external device into the semiconductor memory 13 is being executed, it is inhibited to read data from the semiconductor memory 13 and write the data into the semiconductor memory 12. Owing to such operation, there is no fear that image data read out from the semiconductor memory 13 has data of a mixture of a plurality of pictures. Therefore, image data written into the semiconductor memory 12 or contents of image read out therefrom and displayed on the television monitor are prevented from being deformed and becoming different from one sheet of picture stored in the semiconductor memory 13.

This embodiment can be modified so that the image written from the external device may be reproduced immediately and automatically. For achieving this modification, update operation of the reproduced image responsive to closure of the recording trigger switch 5 is kept waiting during an interval of signal exchange with the external device. Furthermore, means for closing the recording trigger switch 5 mechanically or electrically, for example, without a break is jointly used. Furthermore, for achieving the modification, the microcomputer included in the timing generation circuit 2 is programmed so as to detect the open/close state of the recording trigger switch 5 at pretermined timing intervals such as every timing of inversion of the state detection signal SD from "H" to "L." A function similar to this modification can also be implemented by such a configuration that the signal exchange operation end signal CSSb is used instead of the closure signal of the recording trigger switch 5. If at this time the semiconductor memory 13 is adapted to record a plurality of sheets of pictures, image inputting from the external device is conducted at a rate of one sheet of picture per writing operation. Furthermore, in order to square the written image with the image read out, means for detecting the address signal supplied from the external device and loading its start address into a counter for generating the address signal Ad2 disposed in the timing generation circuit 7 is jointly used.

When the state detection signal SD is "H" in FIG. 5 or FIG. 8, operation for writing data from the external device into the semiconductor memory 13 or operation for reading data from the semiconductor memory 13 into the external device can be executed by level inversion of the read/write changeover signal (R/−W3) supplied from the external device no matter whether the apparatus is in the imaging mode as described with reference to FIGS. 4 and 5 or in the reproduction mode as described with reference to FIG. 8. Furthermore, even in operation which has not been described with reference to FIGS. 5 and 8 and which includes a combination of the operation mode of this embodiment and write access or read access of the semiconductor memory 13 performed by the external device, the control operation as described in FIGS. 5 and 8 using the state detection signal SD outputted from the state detection circuit 23 can prevent data of a plurality of sheets of pictures from being stored in a storage area of the semiconductor memory 13 assigned to data of one sheet of picture. According to the control operation as described in FIGS. 5 and 8, access of the external device to the semiconductor memory 13 is inhibited during execution of data write access to the semiconductor memory 13 (at the time of imaging mode) performed by the internal operation of this embodiment or data read access from the semiconductor memory 13 (at the time of reproduction mode). Furthermore, access to the semiconductor memory 13 performed by the internal operation of this embodiment is inhibited during execution of access to the semiconductor memory 13 performed by the external device.

In the embodiment shown in FIG. 1 and heretofore described, access to the semiconductor memory 13 from the external device is entirely inhibited when the semiconductor memory 13 is accessed by operation started in response to closure of the recording trigger switch 5, i.e., the imaging operation or the reproduction operation.

As apparent from the description of the above described embodiment, access to the semiconductor memory 13 performed by this internal operation is executed by gaining access to only the memory area of image data corresponding to one screen stored in the semiconductor memory 13 per closure of the recording trigger switch 5. When the semiconductor memory 13 is a memory storing data of a plurality of pictures, therefore, the desired effect can be obtained even if the access inhibition control as described above is limited to the above described memory area of data corresponding to one sheet of picture.

Figure 9:
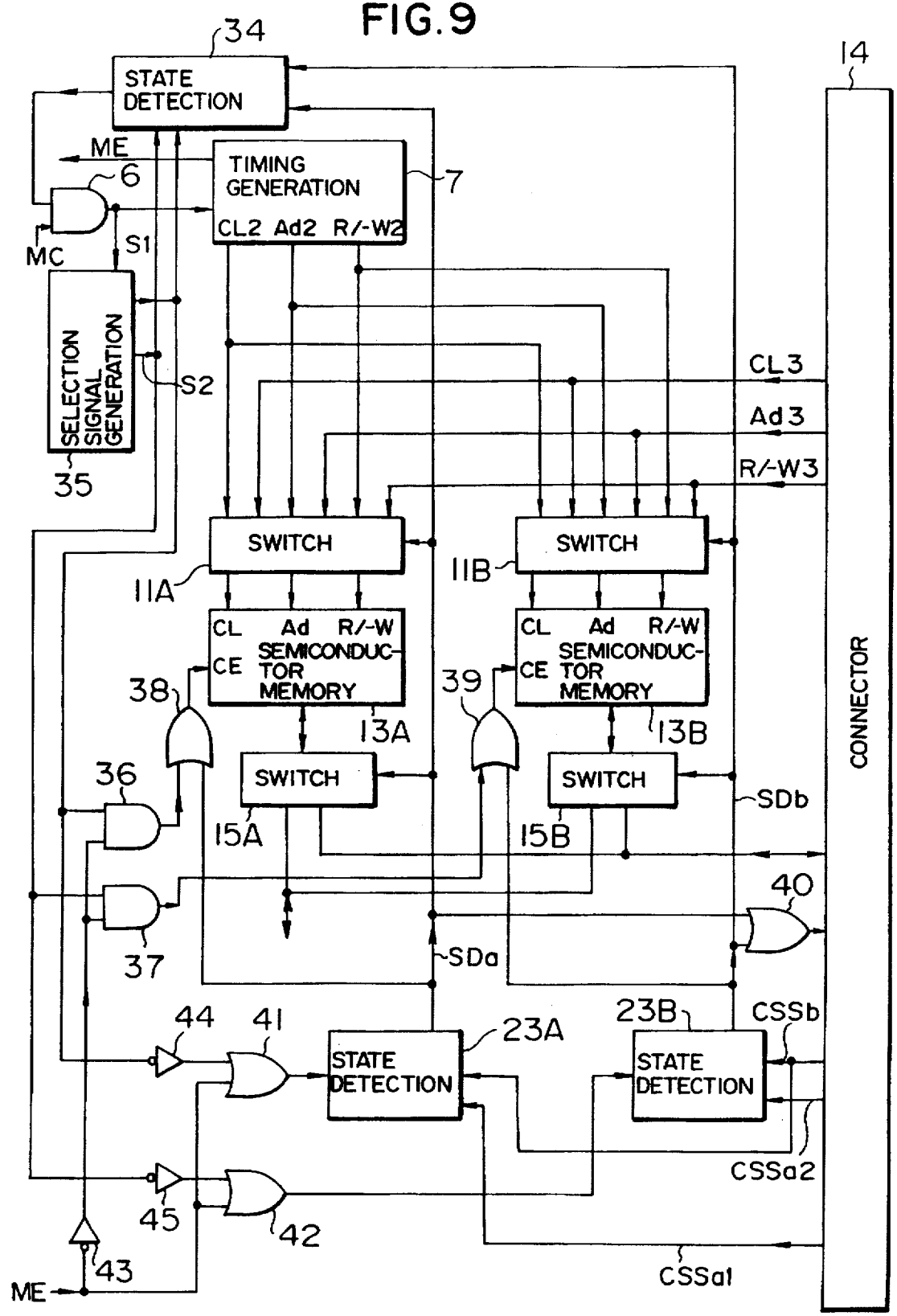
FIG. 9 is a block diagram showing a principal part of another embodiment of an imaging and recording apparatus according to the present invention.

FIG. 9 is a block diagram showing a primary part of another embodiment of a recording and imaging apparatus according to the present invention allowing implementation of such control operation. With reference to FIGS. 9, 11A and 11B denote switches, 13A and 13B semiconductor memories, 15A and 15B switches, 23A, 23B and 34 state detection circuits, 35 a selection signal generation circuit, 36 and 37 AND gates, 38 to 42 OR circuits, and 43 to 45 inverters. Components corresponding to those of FIG. 1 are denoted by like numerals.

In FIG. 9, the left half of FIG. 1, i.e., the timing generation circuit 2, the semiconductor memory 12, the imaging device 1, the camera signal processing circuit 17, and the encoder 19 are the same as shown in FIG. 1 and hence will be omitted. Furthermore, the switch 11, the semiconductor memory 13, the switch 15, and the state detection circuit 23 shown in FIG. 1 are duplicated. That is to say, switches 11A and 11B, semiconductor memories 13A and 13B, switches 15A and 15B, and state detection circuits 23A and 23B are provided. Although not illustrated in FIG. 9, the timing generation circuit 7 generates the clock CL1 and the address signal Ad1 in the same way as FIG. 1.

In accordance with a feature of this embodiment, the semiconductor memories 13 are disposed independently for each sheet of picture to be stored so that access control of image data may be executed independently for each sheet of picture data. In this embodiment, it is assumed that the number of sheets of pictures to be stored is two. As described above, therefore, the semiconductor memory 13, the switch 11 and 15, and the state detection circuit 23 as shown in FIG. 1 are duplicated.

Each of the semiconductor memories 13A and 13B each for storing data of one sheet of picture is formed by one commercially available semiconductor memory IC (or a plurality of commercially available semiconductor memory ICs). In general, the semiconductor memory IC has a chip enable terminal CE. When the logic level of a chip enable signal supplied to this terminal is "H", for example, the semiconductor memory IC is activated by the clock CL, the address signal Ad, and the read/write changeover signal (R/–W). When the logic level of the chip enable signal is "L," the semiconductor memory IC does not accept entirely the above described operation control, and makes the input and output impedance values of the data input/output terminal I/O high to perform disconnection from the external circuit. In this embodiment, selection out of the semiconductor memories 13A and 13B is made by using such a function.

In this embodiment, therefore, the operation control signal MC supplied to the timing generation circuit 7 via the AND gate 6 is also supplied to the selection signal generation circuit 35 formed by a counter or a shift register. This selection signal generation circuit 35 generates selection signals S1 or S2 respectively for selecting the semiconductor memory 13A or 13B.

In this embodiment as well, access to the semiconductor memories 13A and 13B is performed by taking each sheet of picture as the unit in the same way as the embodiment described before. Therefore, both the selection signals S1 and S2 do not simultaneously assume a logic level for selecting the semiconductor memory 13A or 13B. It is now assumed that the selection level is "H." From the external device, a ready situation indication signal CSSa1 which turns "H" when the semiconductor memory 13A is to be selected and a ready situation indication signal CSSa2 which turns "H" when the semiconductor memory 13B is to be selected are supplied via the connector 14.

Upon receiving the operation control signal MC supplied from the timing generation circuit 2 in response to closure of the recording trigger switch 5 shown in FIG. 1, the timing generation circuit 7 executes access to the semiconductor memory 13. In the selection signal generation circuit 35 at this time, the selection signal S1 turns "H" and the selection signal S2 turns "L" as a result of the first closure of the recording trigger switch 5. In response to the second closure of the recording trigger switch 5, the selection signal S1 turns "L" and the selection signal S2 turns "H." In response to the fourth closure of the recording trigger switch 5, the selection signals S1 and S2 return to their initial levels. Thereafter, level change of the selection signals S1 and S2 are repeated as described above each time the recording trigger switch 5 is closed.

The selection signals S1 and S2 are supplied to the AND gates 36 and 37, respectively. Upon start of operation of the timing generation circuit 7, the selection signals S1 and S2 turn "L." During the operation thereof, the operation end signal ME is inverted in level by the inverter 43 and supplied to the AND gates 36 and 37 in order to maintain the levels of the AND gates 36 and 37. Output signals of the AND gates 36 and 37 are supplied to chip enable terminals CE of the semiconductor memories 13A and 13B as chip enable signals via the OR circuits 38 and 39, respectively. Thereby, the semiconductor memories 13A and 13B are alternately selected each time the timing generation circuit 7 executes operation in response to closure of the recording trigger switch 5.

The selection signals S1 and S2 are inverted in level respectively by the inverters 44 and 45 and thereafter supplied to the state detection circuits 23A and 23B via the OR circuits 41 and 42, respectively. Furthermore, the operation end signal ME is also supplied to the state detection circuits 23A and 23B via the OR circuits 41 and 42, respectively. As a result, the output signal of the OR circuit 41 turns "L" only while the semiconductor memory 13A is being accessed by the timing generation circuit 7 and turns "H" during remaining intervals. In the same way, the output signal of the OR circuit 42 also turns "L" only while the semiconductor memory 13B is being accessed by the timing generation circuit 7 and turns "H" during remaining intervals. In the state detection circuits 23A and 23B, respectively, the output signals of the OR circuits 41 and 42 take the place of the operation end signal ME in the state detection circuit 23 shown in FIG. 1.

The ready situation indication signal CSSa1 is supplied from the external device to the state detection circuit 23A. The ready situation indication signal CSSa2 is supplied from the external device to the state detection circuit 23B. These ready situation indication signals CSSa1 and CSSa2 are similar to the ready situation indication signal CSSa supplied to the state detection circuit 23 in FIG. 1. The exchange operation end signal CSSb fed from the external device is supplied to both the state detection circuits 23A and 23B.

The external device changes the ready situation indication signal CSSa1 to "H" when the semiconductor memory 13A is to be accessed and changes the ready situation indication signal CSSa2 to "H" when the semiconductor memory 13B is to be accessed. The external device does not make them "H" at the same time. In case the external device has accessed the semiconductor memory 13A or 13B, the external device generates an impulsive exchange operation end signal CSSb as shown in FIG. 5 each time the access operation of the selected semiconductor memory is finished.

By the configuration heretofore described, the state detection circuit 23A conducts the same operation as that of the state detection circuit 23 shown in FIG. 4. When the semiconductor memory 13A is accessed by the timing generation circuit 7, the state detection signal SDa is kept at "L" irrespective of the state of the ready situation indication signal CSSa1. When this access is not performed, the state detection signal SDa can be changed over to "H" by changing the ready situation indication signal CSSa1 to "H."

When the state detection signal SDa is "H," it changes over the switches 11A and 15A to make respective terminals of the semiconductor memory 13A connectable to the external device. In addition, the state detection signal SDa is supplied to the chip enable terminal CE of the semiconductor memory 13A via the OR circuit 38 to enable the semiconductor memory 13A. Furthermore, the state detection signal SDa informs the external device via the OR circuit 40 that the semiconductor memory 13 has become accessible. The semiconductor memory 13B is also changed over in access by the operation of the state detection circuit 23B in the same way.

In addition, the state detection signals SDa and SDb are supplied to the state detection circuit 34 as well. In the embodiment shown in FIG. 1, the state detection signal SD outputted from the state detection circuit 23 is supplied to the AND gate 6 via the inverter 9, and this state detection circuit 23 is used to control the timing generation circuit 2 so as to wait output of the operation control signal MC. In the embodiment shown in FIG. 9, however, such operation is conducted by using the state detection circuit 34.

That is to say, the state detection circuit 34 can detect, on the basis of the levels of the selection signals S1 and S2, whether the semiconductor memory to be selected by the selection signal generation circuit 35 in the next operation is the semiconductor memory 13A or the semiconductor memory 13B. On the basis of the logic level of the state detection signal SDa or SDb, therefore, the state detection circuit 34 knows the situation of selection of the semiconductor memories 13A and 13B made by the external device. When the semiconductor memory 13A or 13B to be selected is not accessed by the external device, the state detection circuit immediately starts its operation. When the semiconductor memory 13A or 13B to be selected is accessed by the external device, the state detection circuit waits it, or selects the semiconductor memory 13A or 13B which is not accessed and starts its operation.

Figure 10:
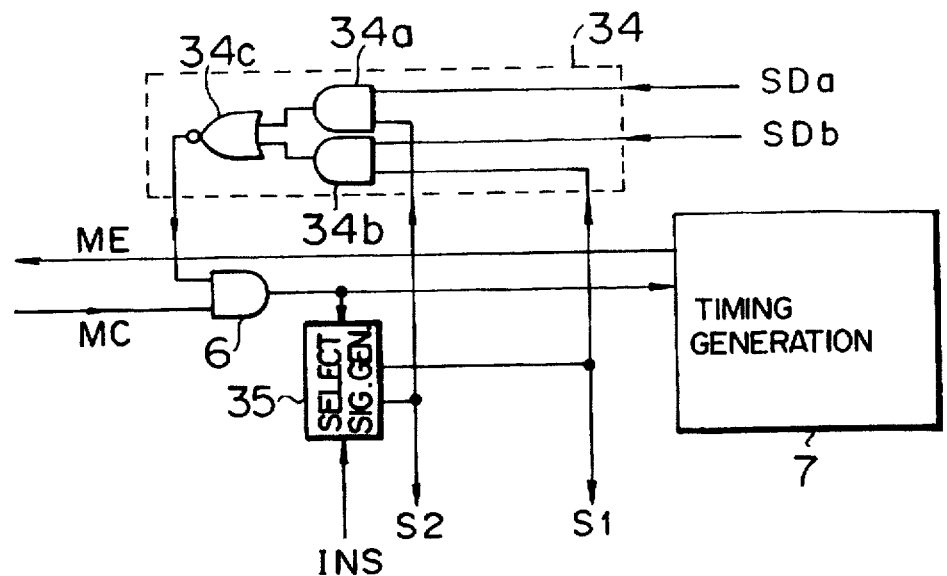
FIG. 10 is a block diagram showing one concrete example of a state detection circuit of FIG. 9.

FIG. 10 is a block diagram showing one concrete example of the state detection circuit illustrated in FIG. 9. In FIG. 10, 34a and 34b denote AND gates and 34c denotes a NOR circuit. Components corresponding to those of FIG. 9 are denoted by like characters.

Assuming now that the selection signal S1 is "H" in FIG. 10, the selection signal generation circuit 35 changes over the selection signals S2 and S1 respectively to "H" and "L" when the next operation control signal MC is inputted. When the selection signal S2 is "H," the selection signal generation circuit 35 changes over the selection signals S1 and S2 respectively to "H" and "L" when the next but one operation control signal MC is inputted.

In the state detection circuit 34, therefore, the selection signal S2 and the state detection signal SDa are supplied to the AND gate 34a whereas the selection signal S1 and the state detection signal SDb are supplied to the AND gate 34b. When the semiconductor memory 13A or 13B which is being accessed by the external device has coincided with the semiconductor memory scheduled to be accessed by the next operation of the timing generation circuit 7, a signal of "H" is outputted from either the AND gate 34a or 34b. At this time, the output signal of the NOR circuit 34c turns "L." Therefore, passage of the operation control signal MC is blocked by the AND gate 6. Until the state detection signal SDa or SDb turns "L" and hence the above described coincidence state is canceled, the wait operation state is continued.

Figure 11:
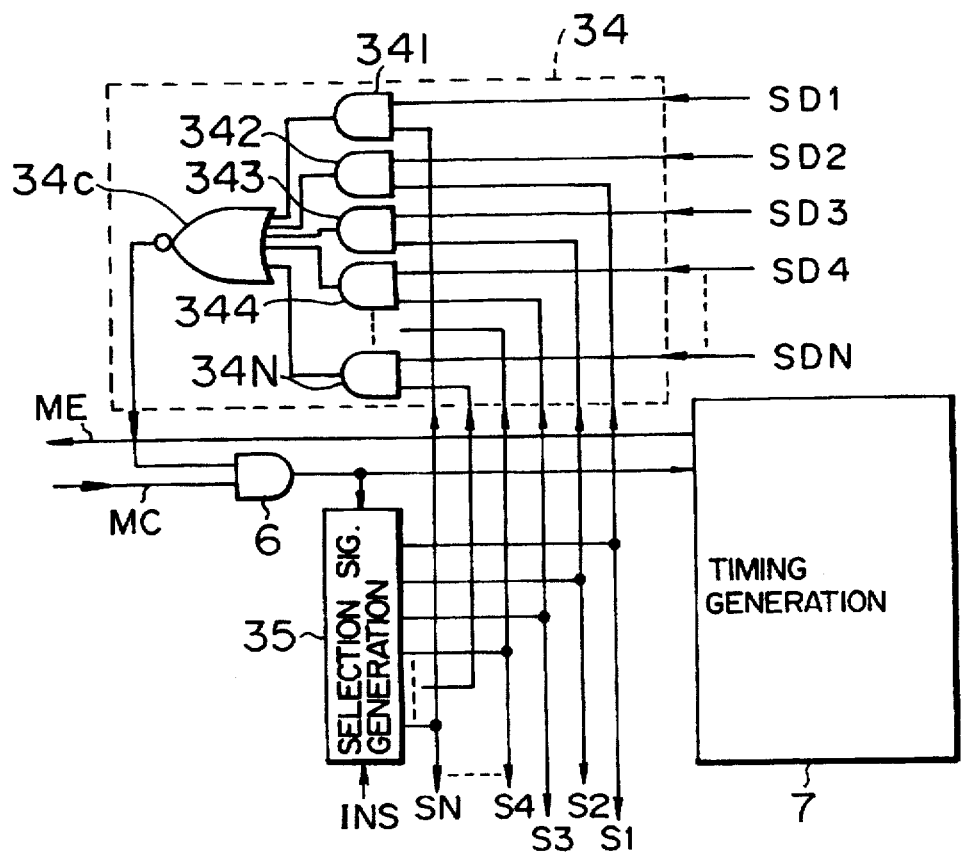
FIG. 11 is a block diagram showing another concrete example of the state detection circuit of FIG. 9.

In the embodiment shown in FIG. 9, one sheet of picture is stored in each of two semiconductor memories 13A and 13B. That is to say, a total of two sheets of pictures are stored. However, three or more sheets can be stored by increasing the number of the semiconductor memories 13 and accordingly installing more circuit configurations each including the switches 11 and 15, the state detection circuit 23, and the OR circuit 38. At this time as well, it suffices to provide one state detection circuit 34. One concrete example of the state detection circuit 34 in case N semiconductor memories are used is shown in FIG. 11. In FIG. 11, numerals 341, 342, 343, 344, . . . , 34N denote AND gates corresponding to the AND gates 34a and 34b of FIG. 10. Components corresponding to those of FIG. 10 are denoted by like numerals.

With reference to FIG. 11, a selection signal generation circuit 35 having the number of stages of counters or shift registers set so as to correspond to N semiconductor memories 13 generates N selection signals S1, S2, S3, S4, . . . , SN, which are supplied to the AND gates 341, 342, 343, 344, . . . , 34N of the state detection circuit 34, respectively. Although not illustrated, N state detection circuits corresponding to 23A and 23B of FIG. 9 are provided. State detection signals SD1, SD2, SD3, SD4, . . . , SDN respectively from N state detection circuits are supplied to the AND gates 341, 342, 343, 344, . . . , 34N, respectively. If any semiconductor memory 13 scheduled to be accessed by the next operation of the timing generation circuit 7 is being accessed by the external device, execution of the operation of the timing generation circuit 7 can be kept waiting owing to such a configuration.

With reference to FIGS. 10 and 11, the initial reset signal INS at the time of turning on power is supplied to the selection signal generation circuit 35. By resetting the above described counters, the initial reset signal INS sets selection signals in the initial state. (In general, the first selection signal S1 is set to "H.")

To the counter of the selection signal generation circuit 35 of FIG. 10 or 11, a digital adder circuit for adding one to the current count thereof and a function of loading the result of addition into the counter may be added. The above described loading is adapted to be executed at timing of inversion of the operation control signal MC from "L" to "H" when the output signal of the NOR circuit 34c is "L." When the AND gate 6 has blocked the operation control signal MC, the selection signal generation circuit 35 automatically counts up owing to such a configuration, and cancels such a condition that the output signal of the NOR circuit 34c turns "L." By the operation control signal MC passed through the AND gate 6 in response to the cancel, the selection signal generation circuit 35 counts up again. As a result, a semiconductor memory which is not being accessed by the external device can be selected to execute data writing.

Even if the semiconductor memory 13 is divided into a plurality of memory blocks which can be independently accessed, the same effects as those of the embodiment shown in FIG. 1 are obtained as heretofore described. Furthermore in this case, when any one of a plurality of memory blocks is accessed by the external device, a memory block which is not accessed may be automatically selected to access the semiconductor memory 13 in the imaging operation or the reproduction operation. In case a semiconductor memory having storage areas for a plurality of sheets of pictures is adopted, therefore, it is also possible to record a plurality of sheets of imaged pictures in storage areas excepting a storage area currently accessed by the external device, even when access to the semiconductor memory 13 is executed by the external device.

In the embodiments shown in FIG. 1 and 9, the recording trigger switch 5 for starting operation is disposed within the apparatus. However, the present invention is not limited to this. For example, the operation may be started by a remote controller using infrared rays. Or the operation start may be commanded from the external device connected to the connector 14.

Furthermore, in the embodiments shown in FIGS. 1 and 9, memory means such as a magnetic disk may also be adopted instead of the semiconductor memory 13. In this case as well, the embodiments can be configured so that changeover control of access to these memories may be executed in the same way as the foregoing description.

Furthermore, in the embodiments shown in FIGS. 1 and 9, image data are compressed or decompressed. However, such a function is not indispensable to the present invention. Furthermore, the semiconductor memory 12 has been used as the buffer memory. Especially in an embodiment having no image data compression or decompression function, however, this semiconductor memory 12 is not indispensable, either. The apparatus may be configured so that image information picked up will be recorded in the semiconductor memory 13 in real time.

Furthermore, in case the memory devices of flash type generating the ready/busy signal described before are used as the semiconductor memories 13, 13A and 13B of FIGS. 1 and 9, the apparatus may be configured so that logical sum signals of ready/busy signals generated by them and the state detection signals SD, SDa and SDb may be transmitted to the external device via the connector 14.

A variant of the embodiment of FIG. 1 will now be described. In this variant, a switch corresponding to the switch 11 is disposed between the switch 10 and the semiconductor memory 12. Furthermore, there are disposed switches for changing over a data input terminal I and a data output terminal O of the semiconductor memory 12 and thereby allowing selection between the connection shown in FIG. 1 and the connection to the external device via the connector 14. The switches are disposed so that the signal indicating the operation state of the timing generation circuit 2 may be changed over by the output signal of the state detection circuit 23 used instead of the operation end signal ME or used in addition to the operation end signal ME. Owing to such a configuration, it is possible to write uncompressed image data supplied from the external device into the semiconductor memory 12, compress the image data in the image data compression circuit 21, and write the compressed image data into the semiconductor memory 13. Or it is possible to write compressed image data supplied from the external device into the semiconductor memory 13, restore the image data in the image data decompression circuit 125, store the restored image data temporarily in the semiconductor memory 12, and thereafter read out the restored image information from the semiconductor 12 into the external device. Furthermore at this time, operation of the state detection circuit makes it possible to automatically avoid duplication between the access to the semiconductor memory 12 started in response to manipulation of the recording trigger switch 5 performed by the user at arbitrary timing and access to the semiconductor memory 12 performed by the external device. Therefore, data of a plurality of sheets of pictures are prevented from being present mixedly in data of one sheet of picture.

FIGS. 12A to 12F are diagrams showing an exterior view and a use example of an embodiment of an imaging and recording apparatus 46 according to the present invention. In FIG. 12A, 46 denotes an imaging and recording apparatus according to the present invention, 47 a light receiving lens for imaging, 48 a finder similar to that of a conventional film camera, and 49 a lens hood.

FIG. 12A shows the exterior view of the imaging and recording apparatus. In the imaging and recording apparatus, the light receiving lens 47 for imaging, the finder 48 and the lens hood 49, which are similar to those of a conventional film camera, are disposed. In the same way as the conventional film camera, a recording trigger switch 5 is disposed on the illustrated left side of the top face and a connector 14 is attached to the illustrated right side. If a semiconductor memory 13 incorporated in the apparatus so as to be undetachable is used, illustrated thickness D can be made extremely thin.

FIGS. 12B to 12E show examples in which a personal computer PC (FIG. 12F) is used as the external device and the imaging and recording apparatus 46 is attached thereto. FIG. 12B shows the case where the connector 14 of the imaging and recording apparatus 46 is directly connected to a socket within the personal computer PC.

FIG. 12C shows an example in which the connector 14 of the imaging and recording apparatus 46 is connected to the personal computer PC via a socket 50 and a cable 51.

In FIG. 12D, the imaging and recording apparatus 46 is mounted on an adapter 52 incorporating a power supply circuit such as a known AC-DC converter for generating a DC voltage from an AC power source, and the adapter 52 is connected to the personal computer PC. In this case, operation power is supplied from an operation power input terminal disposed in the connector 14 to the imaging and recording apparatus 46, and input and output signals of the connector 14 are coupled to the personal computer PC via an electric circuit such as electric wiring or a signal buffer circuit disposed within the adapter 52. The adapter 52 may incorporate a known DC power supply such as a dry battery. In this case, the adapter 52 may be configured exclusively for supplying operation power and may be used together when the imaging and recording apparatus 46 is used outdoors.

FIG. 12E shows an example in which the imaging and recording apparatus 46 is mounted on an adapter 53 having a mechanism similar to a known table lamp and the imaging and recording apparatus 46 is connected to the personal computer PC. In this case, the imaging and recording apparatus 46 is disposed inside a circle drawn by fluorescent tubes of round-shaped fluorescent lamps 54a and 54b. A subject illuminated by the fluorescent lamps 54a and 54b is subjected to imaging. Resultant image information is transmitted to the personal computer PC.

As shown in FIG. 12A, the terminal opening portion of the connector 14 is disposed so as to face toward a direction different from the direction the light receiving lens 47 faces toward. In the example of application as shown in FIG. 12C, therefore, the connector 14 can be surely coupled. Furthermore, by manipulating the recording trigger switch 5, it becomes easy to execute imaging at timing which is not subjected to time management of the external device connected to the connector 14.

Furthermore, terminal positions of the connector 14 shown in FIG. 12A are prescribed by taking, as a reference, the apparatus armoring surface opposite to the direction of incident light to the light receiving lens 47 for imaging. When the apparatus is mounted so that the reference surface may face the adapter or like in application such as FIG. 12B, 12D and 12E, therefore, the direction of incident light is not shaded but opened. As a result, imaging can be done under the state that the imaging and recording apparatus is mounted on the personal computer PC, adapter or the like.

As heretofore described, the imaging and recording apparatus according to the present invention has signal changeover means and a signal transmission connector for accessing, from outside of the apparatus, a memory incorporated in the apparatus to store image information picked up. Even when information stored in the memory is exchanged with an external device, therefore, the memory need not be detached. As a result, the size of the apparatus can be reduced. In addition, the trouble for attaching and detaching the memory is eliminated, and the apparatus can be used more conveniently.

In addition, the imaging and recording apparatus has means for detecting the ready state or execution state of operation for accessing the memory from outside of the apparatus. The apparatus is configured so that execution of operation for writing an image picked up into the memory may be kept waiting when such a state has been detected. Furthermore, the apparatus has means for detecting whether operation for writing the image picked up into the memory is in the ready state or execution state. The apparatus is configured so that execution of operation for accessing the memory from the external device may be kept waiting when such a state has been detected. Thereby, the picked up image writing command responsive to manipulation of the user, at arbitrary timing can be executed without deforming the image information. Even if there is the command while signal exchange with the external device is being executed, contents of exchanged image information do not change. Furthermore, even if the apparatus is connected to the external device via the above described connector while the operation for writing the image picked up into the memory is being executed, contents of the picked up image under writing do not change.

In case the above described memory has a storage area of a plurality of sheets of pictures, image pickup at arbitrary timing is possible by the picked up image writing command at that timing responsive to manipulation of the user, even while signal exchange with the external device is being executed. Accordingly, image pickup can be performed at every possible chance.

What is claimed is:

1. A method of controlling an electric camera having an imaging device for picking up image information, a memory having a plurality of memory areas for storing the image information, an operation start command means for triggering writing operation of the memory, and interface unit for communication with an external device and for transmission of the image information, comprising the steps of:
   reading the memory according to an internal data access in response to the operation start command means;
   receiving a trigger for an external data access via the interface unit;
   inhibiting the execution of the external data access to any of the plurality of memory areas of the memory for continuing the internal data access; and
   starting the reading or writing operation according to the external data access after the internal data access has been completed.

2. The electric camera according to claim 1, wherein each of the plurality of memory areas of the memory stores at least one sheet of picture based on the electric signal.

3. An electric camera comprising:
   an imaging device for converting an optical image focused thereon into an electric signal;
   a memory for storing image data based on the electric signal;
   an interface unit for communication with an external device;
   an operation start command means for triggering the writing operation of the memory by an internal data access; and
   control circuits for controlling reading and writing operations of said memory according to an external data access from the external device and the internal data access by the operation start command means, and for automatically starting the writing operation according to the internal data access after the external data access has been completed when the internal data access occurs during execution of the external data access.

4. The electric camera according to claim 3, wherein each of the plurality of memory areas of the memory stores at least one sheet of picture based on the electric signal.

5. The electric camera according to claim 3, further comprising a camera body containing the electric camera, the interface unit having terminals thereof exposed at an external surface of the camera body.

6. The electric camera according to claim 5, wherein said terminals face toward a direction different from an incidence direction of said optical image.

7. The electric camera according to claim 3, wherein said operation start command means is a switch having an open/close manipulation portion on said electric camera.

8. An electric camera comprising:
   an imaging device for converting an optical image focused thereon into an electric signal;
   a memory for storing image data of at least one sheet of picture based on the electric signal;
   an interface unit for communication with an external device;
   an operation start command means for triggering a writing operation of the memory by an internal data access;
   control circuits for controlling reading and writing operations of said memory according to an external data access from the external device and the internal data access by the operation start command means, and for automatically starting the reading or writing operation according to the external data access after the internal data access has been completed when the external data access occurs during execution of the internal data access.

9. The electric camera according to claim 8, further comprising a camera body containing the electric camera, the interface unit having terminals thereof exposed at an external surface of the camera body.

10. The electric camera according to claim 9, wherein said terminals face toward a direction different from an incidence direction of said optical image.

11. The electric camera according to claim 8, wherein said operation start command means is a switch having an open/close manipulation portion on said electric camera.

12. A method of controlling an electric camera having an imaging device for picking up image information, a memory for storing the image information of at least one sheet of picture, an operation start command means for triggering writing operation of the memory, and an interface unit for communication with an external device and for transmission of the image information, comprising the steps of:
   reading the memory according to an external data access from the external device;
   triggering an internal data access for a writing operation of the memory in response to the start command means during the external data access being executed; and
   automatically starting the writing operation according to the internal data access after the external data access has been completed.

13. A method of controlling an electric camera having an imaging device for picking up image information, a memory for storing the image information of at least one sheet of picture, an operation start command means for triggering writing operation of the memory, and an interface unit for communication with an external device and for transmission of the image information, comprising the steps of:
   reading the memory according to an internal data access in response to the operation start command means;
   receiving a trigger for an external data access via the interface unit during the internal data access being executed; and
   automatically starting the writing operation according to the external data access after the internal data access has been completed.

14. An electric camera comprising:

an imaging device which converts an optical image focused thereon into an electric signal;

a memory which stores image data based on the electric signal;

an interface unit which communicates with an external device; and a control circuit which controls writing operations of said memory according to an external data access from the external device and reading operations of said memory according to an internal data access and which inhibits writing operations of said memory according to an external data access when the internal data access is being executed.

15. An electric camera comprising:

an imaging device which converts an optical image focused thereon into an electric signal;

a memory which stores image data based on the electric signal;

an interface unit which communicates with an external device;

a detect circuit which detects a first state of reading operations of said memory according to an internal data access; and a control circuit which controls writing operations of said memory according to an external data access from the external device and reading operations of said memory according to an internal data access and which inhibits writing operations of said memory according to an external data access when said detect circuit detects said first state.

16. An electric camera comprising:

an imaging device which converts converting an optical image focused thereon into an electric signal;

a memory which stores image data based on the electric signal;

an interface unit which communicates with an external device;

a control circuit which controls writing operations of said memory according to an external data access from the external device and reading operations of said memory according to an internal data access and which inhibits writing operations of said memory according to an internal data access when the external data access is being executed.

17. The electric camera according to claim 16, wherein said control circuit controls starting of the reading operation of said memory according to an internal data access after completion of the writing operations external of said memory according to an external data access from the external device.

18. An electric camera comprising:

an imaging device which converts an optical image focused thereon into an electric signal;

a memory which stores image data based on the electric signal;

an interface unit which communicates with an external device;

a detect circuit which detects writing operations external of said memory according to an external data access from the external device; and a control circuit which controls writing operations of said memory according to an external data access from the external device and reading operations of said memory according to an internal data access and which inhibits reading operations of said memory according to an internal data access when said detect circuit detects the writing operations externally of said memory according to an external data access from the external device.

19. An electric camera comprising:

an imaging device which converts an optical image focused thereon into an electric signal;

a memory which stores image data based on the electric signal;

an interface unit which communicates with an external device;

an operation start commander which triggers a writing operation of the memory by an internal data access; and a control circuit which controls writing operations of said memory according to an external data access from the external device and the writing operation of said memory as triggered by the operation start commander and which inhibits the writing operation of said memory according to the external data access when the internal data access is being executed.

20. An electric camera comprising:

an imaging device which converts an optical image focused thereon into an electric signal;

a memory which stores image data based on the electric signal;

an interface unit which communicates with an external device;

an operation start commander which triggers a writing operation of the memory by an internal data access;

a detect circuit which detects a writing operation of said memory as triggered by the operation start commander; and a control circuit which controls a writing operation of said memory according to an external data access from the external device and the writing operation of said memory as triggered by the operation start commander and which inhibits the writing operation of said memory according to an external data access when said detect circuit detects the writing operation of said memory as triggered by the operation start commander.

21. The electric camera according to claim 20, wherein said control circuit includes an inhibit which inhibits the writing operation of said memory according to an external data access when said detect circuit detects the writing operation of said memory as triggered by the operation start commander.

22. The electric camera according to claim 21, wherein said control circuit controls starting of the reading operation of said memory according to an internal data access after completion of the writing operation external of said memory according to an external data access from the external device.

23. An electric camera comprising:

an imaging device which controls an optical image focused thereon into an electric signal;

a memory which stores image data based on the electric signal;

an interface unit which communicates with an external device;

an operation start commander which triggers a writing operation of the memory by an internal data access; and a control circuit which controls a writing operation of said memory according to an external data access from the external device and the writing operation of said memory as triggered by the operation start commander and which inhibits the writing operation of said memory as triggered by the operation start commander when the external data access is being executed.

24. An electric camera comprising:

an imaging device which converts an optical image focused thereon into an electric signal;

a memory which stores image data based on the electric signal;

an interface unit which communicates with an external device;

an operation start commander which triggers a writing operation of the memory by an internal data access;

a detect circuit which detects a writing operation of the memory according to an external data access from the external device; and a control circuit which controls a writing operation of said memory according to an external data access from the external device and the writing operation of said memory as triggered by the operation start commander and which inhibits the writing operation of said memory as triggered by the operation start commander when said detect circuit detects the writing operation of said memory according to an external data access from the external device.

* * * * *

UNITED STATES PATENT AND TRADEMARK OFFICE
CERTIFICATE OF CORRECTION

PATENT NO. : 5,801,847
DATED : Sep. 1, 1998
INVENTOR(S) : AIZAWA, et al

It is certified that error appears in the above-indentified patent and that said Letters Patent is hereby corrected as shown below:

Correct claims 16, 21 and 22 as follows:

Col. 31, Claim 16, line 2, delete "converting";
line 12, delete "writing" and insert --reading--.

Col. 32, Claim 21, line 2, delete "inhibit" and insert --inhibitor--.

Col. 32, Claim 22, line 2, delete "reading" and insert --writing--.

Signed and Sealed this

Twenty-eighth Day of March, 2000

Attest:

Q. TODD DICKINSON

*Attesting Officer*  *Commissioner of Patents and Trademarks*